US010668468B2

(12) United States Patent
Viasnoff et al.

(10) Patent No.: US 10,668,468 B2
(45) Date of Patent: Jun. 2, 2020

(54) MICRO-TEXTURED SURFACE WITH INTEGRATED MICRO-MIRRORS FOR 3D MULTI-SCALE MICROSCOPY

(71) Applicants: National University of Singapore, Singapore (SG); Centre National de la Recherche Scientifique, Paris (FR)

(72) Inventors: Virgile Nicolas Robert Viasnoff, Singapore (SG); Vincent Studer, Paris (FR); Gianluca Grenci, Singapore (SG); Remi Galland, Singapore (SG); Jean-Baptiste Sibarita, Paris (FR)

(73) Assignees: National University of Singapore, Singapore (SG); Centre National de la Recherche Scientifique, Paris (FR)

( * ) Notice: Subject to any disclaimer, the term of this patent is extended or adjusted under 35 U.S.C. 154(b) by 434 days.

(21) Appl. No.: 14/914,130

(22) PCT Filed: Aug. 27, 2014

(86) PCT No.: PCT/SG2014/000405
§ 371 (c)(1),
(2) Date: Feb. 24, 2016

(87) PCT Pub. No.: WO2015/030678
PCT Pub. Date: Mar. 5, 2015

(65) Prior Publication Data
US 2016/0214107 A1   Jul. 28, 2016

(30) Foreign Application Priority Data

Aug. 28, 2013   (GB) .................................. 1315248.3

(51) Int. Cl.
*G02B 21/04*     (2006.01)
*G01N 21/03*     (2006.01)
(Continued)

(52) U.S. Cl.
CPC ....... *B01L 3/502715* (2013.01); *B01L 3/5085* (2013.01); *G01N 21/03* (2013.01);
(Continued)

(58) Field of Classification Search
None
See application file for complete search history.

(56) References Cited

U.S. PATENT DOCUMENTS 5,208,648 A  *  5/1993  Batchelder ......... G01N 21/9505
                                                   356/237.1
6,154,277 A  * 11/2000  Snelling ............. G01N 15/0205
                                                   250/575
(Continued)

FOREIGN PATENT DOCUMENTS

JP   2002-521733 A   7/2002
JP   2006-30992 A    2/2006
(Continued)

OTHER PUBLICATIONS

Great Britain, Search Report for Application No. GB13152489.3, dated Dec. 6, 2013.
(Continued)

*Primary Examiner* — Neil N Turk
(74) *Attorney, Agent, or Firm* — Klarquist Sparkman LLP

(57) ABSTRACT

A sample holding device for use in transverse illumination of a sample or sub-components of a sample comprising: a support substrate comprising a sample well adapted to contain and be compatible with said sample wherein said well is provided on at least one wall with an angled reflective surface adjacent said sample well which when in use directs a transverse light beam from a light source through a sample contained within said sample well to provide substantially transverse illumination of a sample contained therein and imaging the sample using a single objective.

17 Claims, 9 Drawing Sheets

(51) Int. Cl.
  *B01L 3/00* (2006.01)
  *G01N 21/64* (2006.01)
  *G02B 21/06* (2006.01)
  *G02B 21/00* (2006.01)
  *G02B 21/34* (2006.01)
  *G02B 21/02* (2006.01)
  *G02B 21/16* (2006.01)
  *G02B 21/36* (2006.01)

(52) U.S. Cl.
  CPC ....... *G01N 21/031* (2013.01); *G01N 21/0303* (2013.01); *G01N 21/6458* (2013.01); *G02B 21/0076* (2013.01); *G02B 21/02* (2013.01); *G02B 21/04* (2013.01); *G02B 21/06* (2013.01); *G02B 21/16* (2013.01); *G02B 21/34* (2013.01); *G02B 21/361* (2013.01); *B01L 2200/0642* (2013.01); *B01L 2300/0819* (2013.01); *B01L 2300/0822* (2013.01); *B01L 2300/0858* (2013.01); *B01L 2300/0893* (2013.01); *B01L 2300/168* (2013.01); *G01N 2201/068* (2013.01)

(56) References Cited

U.S. PATENT DOCUMENTS

| | | | |
|---|---|---|---|
| 7,058,244 | B2 | 6/2006 | Iida et al. |
| 7,796,328 | B2 | 9/2010 | Wolleschensky |
| 8,339,704 | B2 | 12/2012 | Seale et al. |
| 2002/0179835 | A1* | 12/2002 | Feygin ................ B01L 3/5085 250/332 |
| 2003/0076587 | A1 | 4/2003 | Stelzer et al. |
| 2003/0129085 | A1* | 7/2003 | Suslick ................ G01N 21/272 422/400 |
| 2003/0190608 | A1* | 10/2003 | Blackburn ........... B01J 19/0093 435/6.11 |
| 2004/0002121 | A1* | 1/2004 | Regan .................. B01L 3/5085 435/7.2 |
| 2005/0030541 | A1 | 2/2005 | Erlbacher et al. |
| 2005/0135974 | A1 | 6/2005 | Harvey et al. |
| 2007/0178012 | A1 | 8/2007 | Ferrante et al. |
| 2008/0158666 | A1 | 7/2008 | Seale et al. |
| 2010/0102248 | A1 | 4/2010 | Milas et al. |

FOREIGN PATENT DOCUMENTS

| | | |
|---|---|---|
| JP | 2007-248159 A | 9/2007 |
| WO | WO 1999/042608 A1 | 8/1999 |
| WO | WO 2000/007056 A1 | 2/2000 |
| WO | WO 2004/013616 A1 | 2/2004 |
| WO | WO 2010/040918 A1 | 4/2010 |
| WO | WO 2010/059902 A2 | 5/2010 |
| WO | WO 2010/060066 A1 | 5/2010 |
| WO | WO 2011/063332 A2 | 5/2011 |

OTHER PUBLICATIONS

PCT, International Search Report and Written Opinion for Application No. PCT/SG2014/000405, dated Nov. 24, 2014.

JP 2016-538894 Office Action dated May 29, 2018 (English translation) (5 pages).

Galland et al., "3D high- and super-resolution imaging using single-objective SPIM," *Nature Methods* 12:641-644, 2015.

JP 2016-538894 Office Action dated Jan. 29, 2019 (English translation) (5 pages).

* cited by examiner

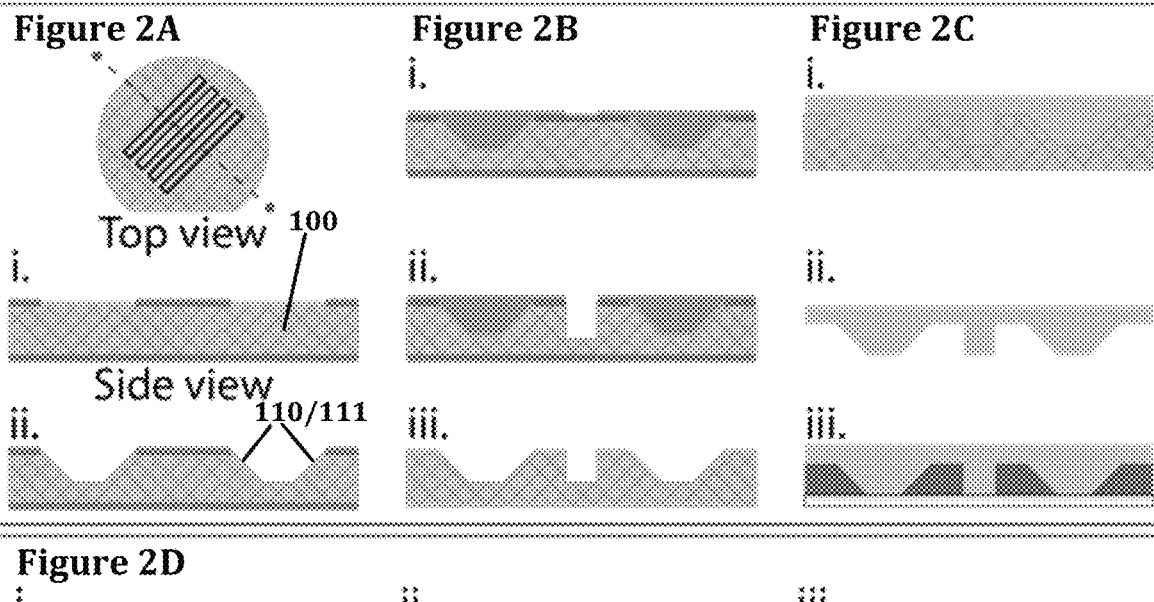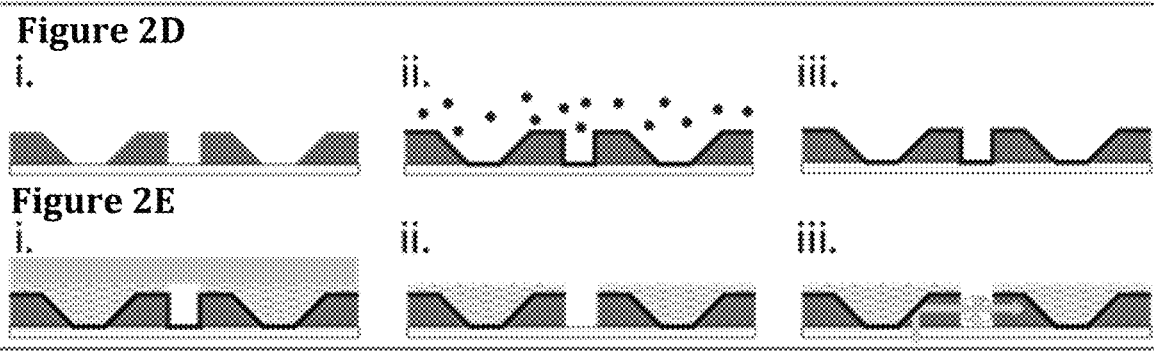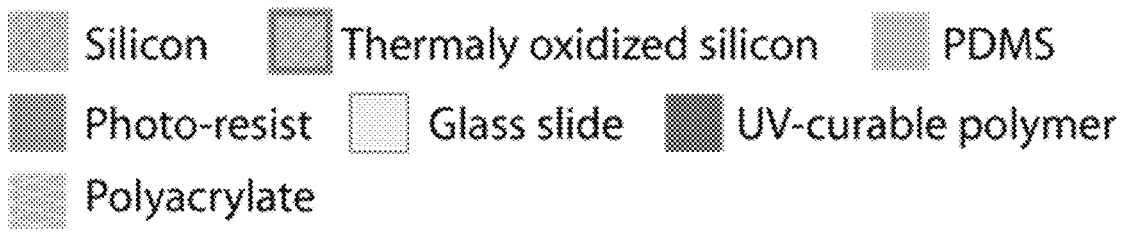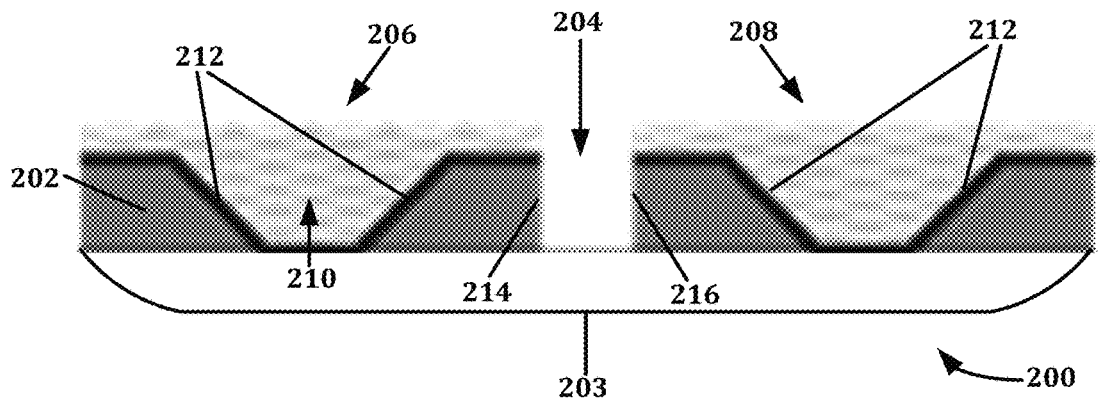

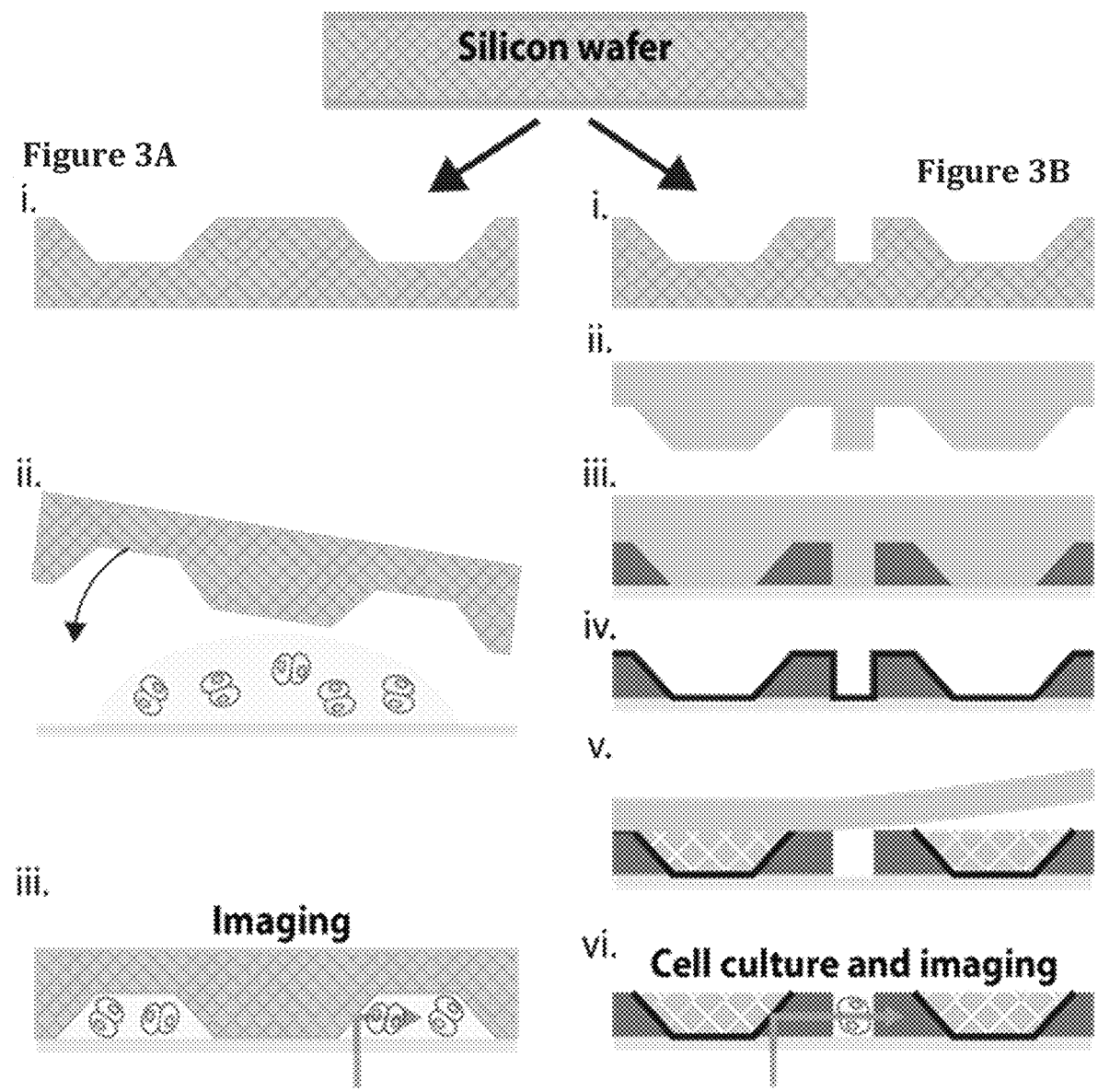

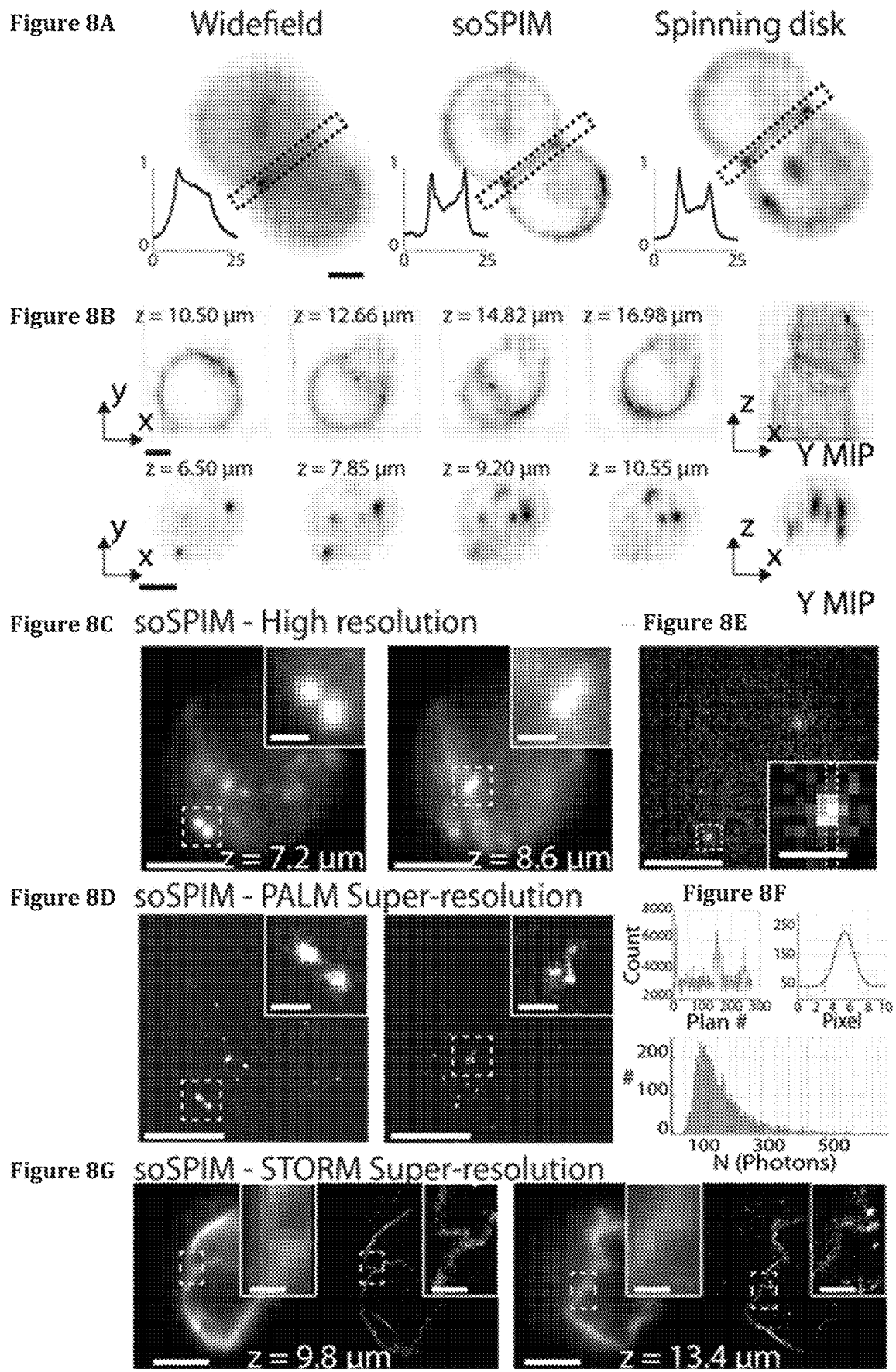

MICRO-TEXTURED SURFACE WITH INTEGRATED MICRO-MIRRORS FOR 3D MULTI-SCALE MICROSCOPY

CROSS REFERENCE TO RELATED APPLICATIONS

This is the U.S. National Stage of International Application No. PCT/SG2014/000405, filed Aug. 27, 2014, which was published in English under PCT Article 21 (2), which in turn claims the benefit of Great Britain Application No. 1315248.3, filed Aug. 28, 2013.

FIELD OF THE INVENTION

This disclosure relates to a device for containing a sample which is adapted to fit to any microscope assembly and provide transverse illumination of a sample or samples through a single objective; uses of the device in light/fluorescence microscopy, in particular but not exclusively Selective Plane Illumination Microscopy [SPIM]; and methods to fabricate the device.

BACKGROUND TO THE INVENTION

Light microscopy is based on propagating light from an illuminated sample which is passed through a set of lenses resulting in an enlarged view of the desired object. This basic principle is used in a variety of microscopic techniques but suffers from a range of deficiencies such as limited resolution and reduced image clarity. The optical resolution in light microscopy is due to diffraction of light and therefore objects smaller than 250 nm are difficult to resolve. This is even worse in the z direction (optic axis), where this limit is extended to 500 nm or more. Nevertheless, many cellular structures and components are often smaller than this optical resolution limit and determining the properties of biomolecules such as proteins in their natural environment is important when analysing their function and elucidating cellular processes. The application of microscopes in life and material science is ever increasing and methods allowing the imaging of small objects under physiological conditions are highly desirable. Resolution in live samples is generally lower than that in fixed specimens because of the size of the sample, the scattering of tissue, lack of pigmentation and the movement of cellular components.

Illumination techniques such as STimulated Emission Depletion (STED) microscopy, Structured Illumination Microscopy (SIM), or single-molecule-based (SM) techniques (PALM/STORM) have revolutionised microscopy and enabled so called ultra-high resolution. Although these techniques offer clear advantages in terms of spatial resolution over the traditional illumination methods, creation of these images require complex instrumentation and data analysis. These techniques suffer from deep imaging capabilities of live biological samples.

Fluorescence Light-Sheet microscopy techniques have become increasingly popular and are more suitable for imaging live cells. The idea behind light-sheet-based microscopy techniques is to illuminate only a thin layer of the sample from the side, vertical to the direction of observation in a well-defined volume around the focal plane of the detection optics. This technique does not require the use of strong lasers making it minimal invasive and reducing photobleaching.

In a widely adopted light-sheet technique Selective Plane Illumination Microscopy (SPIM) cylindrical optics or scanning through galvanometric mirrors are used to create a sheet of light of varying thickness and can be adapted to different sample sizes: for smaller samples (20-100 µm), the light-sheet can be made very thin (~1 µm), whereas for larger samples (1-5 mm), the sheet has to be thicker (~5-10 µm) to remain relatively uniform across the field of view.

In contrast to the detection system used in epifluorescence microscopy, where a single objective lens is used to both illuminate the sample and to collect its fluorescence along the same path, SPIM comprises: (1) a detection lens horizontally aligned and immersed in a fluid-filled chamber, with a sample embedded in a transparent gel and immersed in the chamber medium held from the top; (2) an excitation lens to illuminate the sample perpendicularly to the optical axis of the detection lens; and (3) single cylindrical lens, or galvanometric mirrors, forming the light-sheet inside the chamber through the excitation lens. A stack of images is acquired by moving the sample in a stepwise fashion along the detection axis.

Although Fluorescence Light-Sheet microscopy addresses in principle some of the limitations encountered by other techniques, complex machinery and difficult set ups make this method unsuitable for routine laboratory practise. As described above, Fluorescence Light-Sheet microscopy requires 2 objectives to be placed perpendicularly and close to the sample, which besides the distinctive machinery requires also special sample holders and prevents using high NA objective and regular coverslips. It is apparent that there is no optimal solution which can address the issue of imaging in 3D an entire single cell with best possible nanometric resolution provided by SM-based super-resolution microscopy.

This disclosure relates to a device for containing a sample which is adapted to fit to any microscope assembly and provide light sheet microscopy of a sample or samples contained in the device. The device includes a sample well wherein one or more sides of the well are provided with an angled reflective surface adapted to reflect a light sheet transversely through a sample to provide a fluorescence image detectable by a single objective. The light sheet and fluorescence collection are performed through the same objective. The device provides a simplified and inexpensive solution to the aforesaid problems associated with high resolution fluorescence microscopy. The disclosure provides a single objective SPIM [soSPIM] approach and allows performing SPIM imaging on a standard inverted microscope by virtue of an array micro-mirrored chip. The detection and excitations are performed through the same and unique single objective. The device can be scaled to include variable size reflective surfaces (e.g. from 20 microns to 2 mm) and using the appropriate magnification objectives (e.g. from 100× to 10×), the soSPIM system allows 3D SPIM from 3D high- and super-resolution of a single cell, up to the whole organism level, [for example embryo imaging], on the same instrument.

The disclosure demonstrates 3D imaging capabilities using 100×, 60×, 40× 20× and 10× objectives with excellent resolution and SM-based super-resolution microscopy. Advantageously, 3D optical sectioning using the device does not require moving the sample, but only the objective and the light sheet, allowing acquisition speeds comparable with other imaging techniques such as spinning-disc microscopy.

Moreover, the use of arrayed devices allows simultaneous imaging of multiple cells. This provides the capability to image multiple single cells simultaneously to dramatically reduce the acquisition time and improve imaging throughput. The arrayed devices can contain thousands of single cell wells facilitating sample processing of cells and even whole organisms, such as embryos.

STATEMENTS OF INVENTION

According to an aspect of the invention there is provided a sample holding device for use in transverse illumination of a sample or sub-components of a sample comprising: a support substrate comprising a sample well adapted to contain and be compatible with said sample wherein said well is provided on at least one wall with an angled reflective surface adjacent said sample well which when in use directs a transverse light beam from a light source through a sample contained within said sample well to provide substantially transverse illumination of a sample contained therein and imaging the sample using a single objective.

Reference to "sample or sub-components" includes whole cells or sub-cellular parts and also whole organisms (or sub-organism parts) such as embryos.

In a preferred embodiment of the invention said well comprises at least two angled reflective surfaces wherein said surfaces are positioned substantially opposite each other and defining a space in which said sample is placed.

In a preferred embodiment of the invention said well is a channel comprising two angled reflective surfaces wherein said surfaces are positioned substantially opposite each other and defining a space in which said sample is placed.

In a further preferred embodiment of the invention the first and/or second angled reflective surface is angled between about 20° to 80°.

In a preferred embodiment of the invention said angled reflective surface has an angle selected from the group consisting of: 25°, 30°, 35°, 45°, 50°, 55°, 60°, 65°, 70°, 75° or 80°+/−5%.

In a preferred embodiment of the invention said angled reflective surface is between about 44°-46°+/−5%

In a preferred embodiment of the invention said angled reflective surface is angled at about 45°+/−5%.

In a preferred embodiment of the invention said reflective surface is provided as a metal deposition on all or part of said angular surface[s].

In a preferred embodiment of the invention said reflective surface comprises gold.

In an alternative preferred embodiment of the invention said reflective surface comprises chromium.

In a preferred embodiment of the invention said reflective surface comprises a mixture of deposited metals. Preferably said mixture comprises chromium and gold.

In a preferred embodiment of the invention said support substrate is wholly or partly opaque.

In an alternative preferred embodiment of the invention said support substrate is wholly or partly transparent.

In a preferred embodiment of the invention said support substrate is a composite comprising at least first and second parts comprising at least first and second polymers wherein said first part forms a body of the support substrate and comprising said first polymer and said second part forms a sample well and comprising said second polymer.

In a preferred embodiment of the invention said first part has a higher refractive index when compared to said second part.

In preferred embodiment of the invention said angled reflective surface does not comprise a deposited reflective metallized surface and said transverse light beam is reflected by total internal reflection.

In a preferred embodiment of the invention the refractive index of said first part is between about 1.40 and 1.59+/−5%.

Preferably the refractive index of said second part is about 1.33+/−5%.

In a preferred embodiment of the invention said sample comprises a cell or cells. Preferably said cell or cells are live.

In an alternative preferred embodiment of the invention said cell or cells are fixed.

In a preferred embodiment of the invention said device comprises a plurality of sample wells of similar or identical dimensions and arranged in an array and adapted for sequential or simultaneous analysis of samples contained within said sample wells.

In a preferred embodiment of the invention said device is fabricated from a UV curable polymer.

In a preferred embodiment of the invention said device is fabricated from an acrylate based polymer.

In a preferred embodiment of the invention said acrylate based polymer is a polyacrylate.

In a preferred embodiment of the invention said device is fabricated from a polycarbonate based polymer.

In an alternative preferred embodiment of the invention said device comprises a polystyrene polymer.

In an alternative preferred embodiment of the invention said device is fabricated from an elastomeric polymer.

In a preferred embodiment of the invention said elastomeric material is an organic silicone based polymer.

In a preferred embodiment of the invention said organic silicone based polymer is polydimethylsiloxane.

In a preferred embodiment of the invention said device is fabricated from a polymeric material that has a refractive index matched to cell culture medium to provide an optically clear device.

In a preferred embodiment of the invention said device is further provided with a removable lid contacting the opening of the device sample well and when in use creating a contained sample well to contain a sample.

In a preferred embodiment of the invention the height, length and width of said sample well is at least 10 µm.

In a further preferred embodiment of the invention the height or length or width of said sample well is between 10 µm and 2000 µm.

In a preferred embodiment of the invention the height and/or length and/or width of said sample well is selected from the group: at least 50 µm, 50 µm, 100 µm, 200 µm, 300 µm, 400 µm, 500 µm, 600 µm, 700 µm, 800 µm, 900 µm or 1000 µm.

Alternatively, the height and/or length and/or width of said sample well is selected from the group: at least 1100 µm, 1200 µm, 1300 µm, 1400 µm, 1500 µm, 1600 µm, 1700 µm, 1800 µm, 1900 µm or at least 2000 µm.

It will be apparent that the device according to the invention can be fabricated and adapted to receive samples such as single cells, or larger whole tissue or organism samples which can be imaged by soSPIM using reflective surfaces according to the invention.

According to an aspect of the invention there is provided a sample holding device according to the invention for use in light microscopy.

According to a further aspect of the invention there is provided a sample holding device according to the invention for use in fluorescence microscopy.

In a preferred embodiment of the invention said device is for use in light sheet microscopy.

Preferably said device is for use in Selective Plane Illumination Microscopy.

According to a further aspect of the invention there is provided a microscope assembly comprising a sample holding device according to the invention.

In a preferred embodiment of the invention said microscope assembly is a light microscope assembly.

In an alternative preferred embodiment of the invention said microscope assembly is a fluorescence and/or light microscope assembly.

In a preferred embodiment of the invention said microscope assembly is adapted for light sheet microscopy.

Preferably, said light sheet microscopy is Selective Plane Illumination Microscopy.

In a preferred embodiment of the invention said assembly includes a variable focus lens which when in use controls the focal point of a light sheet.

According to a further aspect of the invention there is provided a method to image a biological sample using a microscope assembly comprising the steps:
 i) providing a device according to the invention comprising one or more samples;
 ii) assembling said device into said microscope assembly;
 iii) illuminating said sample by the provision of a light source directed to the angled reflective surface of said device to reflect a light sheet through a part of said sample;
 iv) detecting the light emitted by said sample by a single objective; and
 v) collecting the image so formed and optionally storing an image of said sample.

In a preferred method of the invention said light source is selected from the group consisting of: a Gaussian beam, a Gaussian light sheet, a Bessel beam.

In a preferred method of the invention said method is Selective Plane Illumination Microscopy.

Preferably Selective Plane Illumination Microscopy uses a Gaussian light sheet light source.

In a preferred method of the invention said microscope assembly comprises a variable focus lens which controls the focal point of a light sheet generated by said light source.

According to a further aspect of the invention there is provided a screening method to monitor the effect of a test agent on cell function comprising:
 i) providing a sample holding device according to the invention comprising one or more wells wherein said wells comprise one or more cell-types;
 ii) contacting the well[s] with an agent to be tested; and
 iii) microscope analysis of the cell[s] in (ii) to determine the effect of said test agent on said treated cell[s].

In a preferred embodiment of the invention said device comprises a cell array and is adapted to be read by an array reader.

A number of methods are known which image and extract information concerning the spatial and temporal changes occurring in cells expressing markers of gene expression. Moreover, U.S. Pat. No. 5,989,835 which is incorporated by reference, discloses optical systems for determining the distribution or activity of fluorescent reporter molecules in cells for screening large numbers of agents for biological activity. The systems disclosed in the above patents also describe a computerised method for processing, storing and displaying the data generated. The screening of large numbers of agents requires preparing arrays of cells for the handling of cells and the administration of agents. The sample holding device according to the invention can be used for compatibility with automated loading and robotic handling systems. Typically, high throughput screens use homogeneous mixtures of agents with an indicator compound which is either converted or modified resulting in the production of a signal. The signal is measured by suitable means (for example detection of fluorescence emission, optical density, bioluminescence) followed by integration of the signals from each well containing the cells, agent and indicator compound.

According to a further aspect of the invention there is provided the use of a sample holding device according to the invention in the diagnosis or prognosis of disease.

According to a further aspect of the invention there is provided a method for the diagnosis or prognosis of disease comprising the steps:
 i) providing an isolated cell sample from a subject and placing the sample in a sample holding device according to the invention;
 ii) assembling the device according to i) above into a microscope assembly;
 iii) microscopic analysis of the cell sample;
 iv) comparison of the cell sample in iii) above with a normal, control cell sample; and
 v) determine the structural and/or functional differences between the sample tested and the control sample as a measure of disease state.

According to a further aspect of the invention there is provided a method for the fabrication of a sample holding device for use in light microscopy of a biological sample comprising the steps:
 i) providing a sample holding device comprising: a support substrate comprising one or more sample wells adapted to contain and be compatible with a sample wherein said well is provided on at least one wall with an angled surface adjacent said sample well; and
 ii) depositing on at least the angled surface of said device a metal to provide a reflective surface.

In a preferred embodiment of the invention said device is fabricated from a UV curable polymer.

In a preferred embodiment of the invention said device is fabricated from an acrylate based polymer.

In a preferred embodiment of the invention said acrylate based polymer is a polyacrylate.

In a preferred embodiment of the invention said device is fabricated from a polycarbonate based polymer.

In an alternative preferred embodiment of the invention said device is fabricated from an elastomeric polymer.

In a preferred embodiment of the invention said elastomeric material is an organic silicone based polymer.

In a preferred embodiment of the invention said organic silicone based polymer is polydimethylsiloxane.

In a preferred method of the invention said metal is gold or chromium.

In a preferred embodiment of the invention said deposited metal is a combination of chromium and gold.

In a preferred method of the invention said metal is deposited by thermal evaporation.

According to an aspect of the invention there is provided a sample holding device obtained or obtainable by the method according to the invention.

According to a further aspect of the invention there is provided a kit comprising:
 i) a device comprising a support substrate comprising one or more sample wells adapted to contain and be compatible with a sample wherein said well is provided on at least one wall with an angled surface adjacent said sample well;
 ii) one or more metals; and optionally
 iii) a closure adapted to fit the opening of the device sample well.

Throughout the description and claims of this specification, the words "comprise" and "contain" and variations of the words, for example "comprising" and "comprises", means "including but not limited to", and is not intended to (and does not) exclude other moieties, additives, components, integers or steps. "Consisting essentially" means having the essential integers but including integers which do not materially affect the function of the essential integers.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

An embodiment of the invention will now be described by example only and with reference to the following figures;

BRIEF SUMMARY OF THE DRAWINGS

FIGS. 1A-2E illustrates the fabrication process for the final polymeric device. (A-i.) opening windows are defined on a (100)-oxidized silicon wafer by UV-photolithography process. (A-ii.) (100) oxidized wafer is structured with grooves defined by 45° slanted (110) crystal planes as reported in the text (a). (B-i.) Opening in the remaining oxide layer are then defined by UV lithography and RIE; (B-ii.) Micro-wells are then carved by plasma dry etching in the silicon using the structured oxide as a mask (b). (B-iii.) The photolithographic resist and the oxidized layer is then removed. (C-i.) The silicon mold is replicated by casting of PDMS elastomer; (C-ii. and iii.) after thermal curing, the PDMS replica is used as mold for the fabrication of a structured sheet, exploiting capillarity filling of the cavities formed by sticking the PDMS to a cover slide (c). The polymeric sheet obtained in (c) (D-i.) is then coated with a metallic film (D-ii.), generating the mirroring 45° slanted surfaces close to the central micro-well (D-iii.) (d). (E-i.) The device is then covered with a protective layer preferably with a UV curable polymer (polyacrylate) position by capillary filling. (E-ii.) A final metal etching step removes the inhomogeneous metallic layer inside the well (e). (E-iii.) The device is ready for cell culture and 3D volume imaging of cells located within the micro-wells;

FIG. 2F illustrates a partial, cross-sectional side view of a sample holding device 200 for use in transverse illumination of a sample or sub-components of a sample. Sample holding device 200 comprises a transparent support substrate 202. Transparent substrate 202 comprises a base 203, a plurality of grooves, and a sample well 204, the sample well adapted to contain and be compatible with said sample. Sample well 204 is disposes between first and second grooves 206 and 208 of the plurality of grooves, the first and second grooves 206 and 208 each comprising a cavity 210 flaked by two angled reflective surfaces. The two angled reflected surface flanking each of the cavities of the first and second grooves 206 and 208 are indicated at 212. The sample well is defines by a first vertical wall 214 of the transparent support substrate, a second vertical wall 216 of the transparent support substrate, and the base 203 of the transparent support substrate 202. The first vertical wall is adjacent to one of the two angled reflective surfaces 212 flanking the cavity of the first groove 206 and the second vertical wall is adjacent to one of the two angled reflective surfaces 212 flanking the cavity of the second groove 208. The first and second vertical walls 214 and 216 are oriented vertically with respect to the base 203 of the transparent support substrate 202.

FIGS. 3A-3B illustrate the fabrication process and imaging procedure of biological sample. (A) Etched silicon wafers were used as 45° micro-mirrors to create a light sheet that passed perpendicular to the optical axis of the objective. An anisotropic wet etching process is first used to create 45° surfaces on a silicon wafer (i). The wafer is then directly pressed and sealed on a clean coverslip where a drop of the biological sample to be imaged has been deposited (ii). The biological sample is ready for imaging (iii). (B) The fabrication process of a UV-curable polymer based device displaying micro-wells flanked with 45° metallized surfaces. Anisotropic and dry etching processes are used to defined 45° surfaces and micro-wells respectively within a silicon wafer (i). A PDMS replica of this wafer is realized (ii) and used to reproduce the wafer shape on a coverslip in a UV-curable polymer via a capillary filling process (iii). The polymer surface is then metallized with a chrome layer under high vacuum (iv) and a final step enables protection of the 45° surfaces and to etch the metal deposited in the micro-wells (v). The UV-curable device is finally ready for cell culture and imaging (iv.);

FIGS. 8A-8G illustrate 3D high- and super-resolution capabilities of the soSPIM method. (A) Comparison between widefield acquisition and the sectioning capabilities of soSPIM and spinning disk methods on S180 cells expressing the membrane protein E-Cadherin-GFP. The inset represents the averaged line scans within the red boxes for comparison of sectioning capabilities. (B) Upper panel: soSPIM optical sections of a S180 cell doublet expressing the membrane protein E-Cadherin-GFP positioned within a 24×24 µm² microwells flanked by a 45° mirroring surface. The upper right panel represents the Maximum Intensity Projection (MIP) along the y-axis. Lower panel: soSPIM optical sections of U2-OS cells expressing the nucleolus protein Fibrilarin tagged with the photo-convertible protein dendra2. The lower right panel represents the MIP along the y-axis. (C) High- and (D) super-resolution images within the nucleus of U2-OS cells expressing the nucleolus protein Fibrilarin-dendra2 at two different planes 1.44 µm apart, 7 µm above the coverslip. The insets display zooms of the white regions within the high and super-resolution images. (E) Example of one of the 8,000 frames, obtained during PALM sequence acquisition, showing 2 single-molecules with a low background noise even at 7 µm above the coverslip. This is due to the high sectioning capability of the soSPIM approach. Inset: zoom on a single-molecule detected in the white box. (F) Left upper panel: time trace recorded within the white box of panel (E) during 300 planes, illustrating the typical single-molecule signature. Upper right panel: single-molecule intensity profile (red line) of the single-molecule represented in the (E) inset along the white box, with its Gaussian fit (black line) given a FWHM of 2.51 pixels (402 nm). Lower panel: histogram of the collected number of photons per localization during the PALM acquisition of panel (D). (G) soSPIM high- and super-resolution images of fixed S180 cells within 24×24 µm² wells at two different planes 8.8 µm (left panel) and 13.4 µm (right panel) above the coverslip. The nuclear proteins lamin were stained with the organic photo-switchable fluorophore FLIP 565. The insets display zooms on the white regions within the high- and super-resolution images. All scale bars are 5 µm and 1 µm in the insets;

MATERIALS AND METHODS

Fabrication of Device

Silicon wet chemical etching is a commonly used method for the fabrication of Optical Micro Electro-Mechanical Systems (MOEMS), for it requires low-cost equipment and it allows high throughput production of structures with a fine definition of spatial geometries [70, 71]. The etching rate of Si depends strongly on crystallographic orientation and etching conditions: composition and temperature of the chemical solution, among others parameters, allow to select the emerging crystal planes. By selecting the wafer orientation, the geometry of the opening in the masking layer and the chemistry of the etching, many different structures were shown to be achievable [48, 72, 73].

Our application requires the definition of a slanted mirror, with an angle of 45° toward the plane surface. The mirroring surface needs to be as smooth as to create a uniform illumination sheet when enlightened with a scanning laser beam. A roughness of the surface is then acceptable, provided that its rms value is well below the wavelength of the light used. Both these conditions are granted if a suitable wet etching process is selected. In the following (see 45° slanted mirror fabrication in Methods) one possible process is described and examples of the obtained structures are shown. Finally, in Fabrication of structured polymeric sheets, we show how these structures could be used as a template for the micro-fabrication of our final device.

45° Slanted Mirror Fabrication

Silicon wafer with (100) orientation, single side polished and thermally oxidized (300 nm thick) were bought from commercial provider (Bonda Technology Pte Ltd 10 Anson Road, #18-18 International Plaza, Singapore 079903). Opening in the oxide layer were defined by optical lithography and Reactive Ion Etching (RIE) as follows. AZ 5214E (MicroChemicals GmbH, Nicolaus-Otto-Str. 39 D-89079 Ulm, Germany) resist was spin coated at 3000 rpm and soft baked for 1 min at 125° C. on a hot plate, for a final thickness of ~1.1 µm. The resist was exposed to the i-line of a mercury arc lamp, with an energy dose of 100 mJ/cm². Development is done by immersion in AZ400 developer diluted to 1:4 in water for 1 min, rinsing in water and final drying with gentle nitrogen blow. The lithographed resist layer was then used as a mask for a RIE step; $CF_4$ (28.5 sccm)+$O_2$ (1.5 sccm) gas mixture at $3*10^{-1}$ mbar with 150 W applied power generating a plasma with a bias of 120 V was applied for 5 min, removing the oxide layer from the cleared areas. Stripping of the resist led to the wafer ready for wet etching of Si.

Figure 1A:
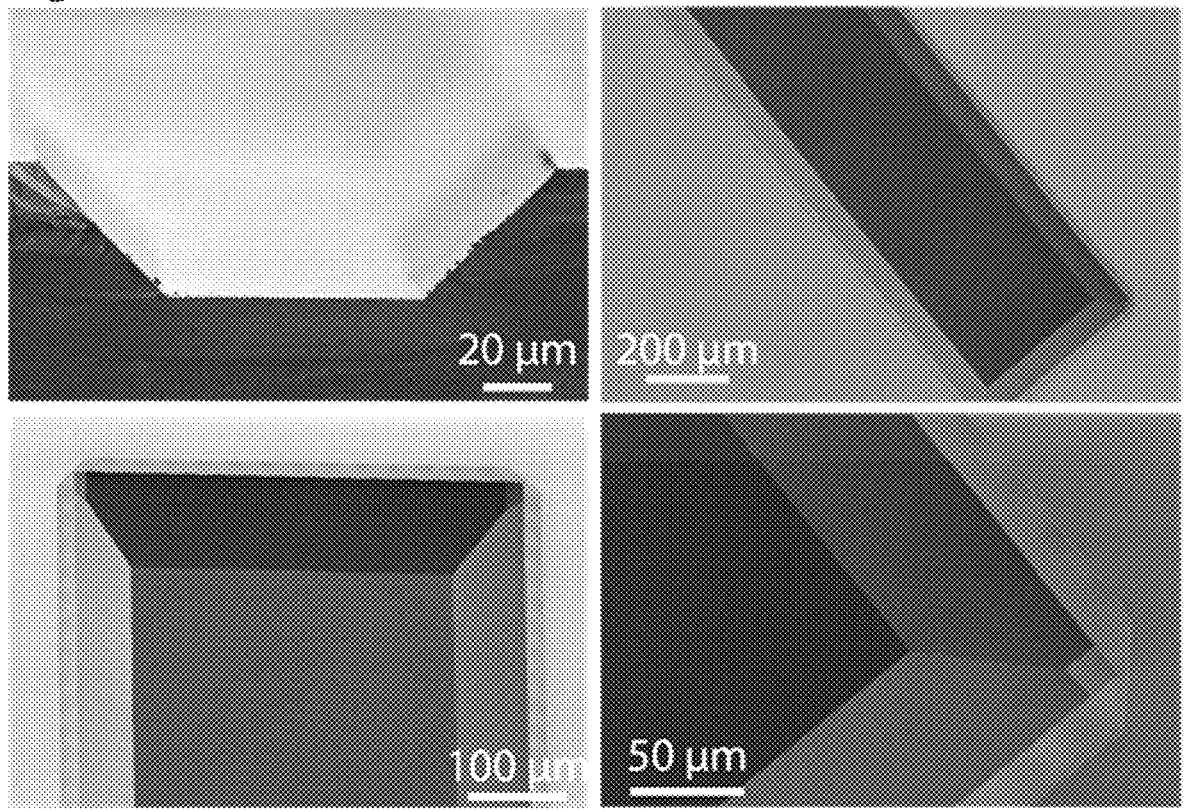
FIGS. 1A-1C illustrate: (A) SEM images of microgrooves displaying 45° surfaces realized by anisotropic KOH wet etching on a silicon wafer. (B) SEM images of a silicon wafer displaying 45° surfaces and two different sizes of micro-wells (60×300 μm and 25×25 μm). (C) Transmission image of the final device in UV-curable polymer with metallized 45° surfaces and sealed in a 30 mm bottom free plastic dish.
Figure 1B:
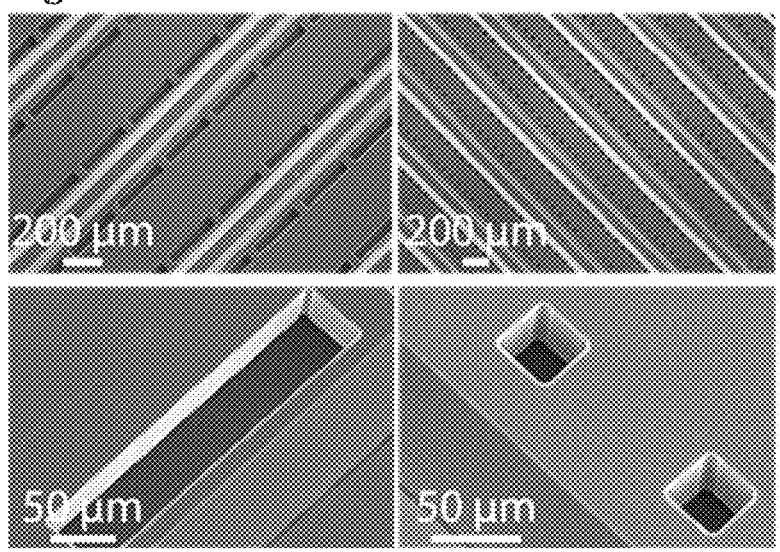

Mirroring surfaces with a 45° slant angle toward the (100) surface are obtained if (110) planes emerge during the wet etching process. The etching rate of different crystal planes (referred as $v_{hkl}$ in the following) could be tailored by selecting the appropriate chemistry and geometry. Two conditions needs to be fulfilled: 1) the grooves opened in the oxide masking layer should be oriented with an angle of 45° (in the plane) by respect to the <110> main flat on the (100) wafer; 2) the chemical composition of the etching solution should comprise in addition to the alkaline agent (e.g. KOH or TMAH) an organic surfactant[i]. We used two different chemistries, in which $v_{100} > v_{110} > v_{111}$. Wet etching A was 3M KOH+1M IPA alcohol (water solution) at 75° C.; wet etching B was TMAH 30% in water+200 ppm Triton© surfactant at 75° C. Planes (111) are always the slowest etched, thus for very prolonged etching time, eventually all the initial structures will collapse to a rectangular groove delimited by (111) planes (forming and angle of 54.7° toward (100) planes). FIG. 1 shows typical results of an etching prolonged for 1 h 30 min. In both cases, the quality of the mirroring surfaces was good enough for optical application.

Fabrication of Structured Polymeric Sheets

The fabrication process leading to a structured polymeric sheet is detailed in the following. Briefly, the silicon device produced with wet etching is used as a master for the replica (with inverted tone) of a PDMS intermediate mold, which is again replicated in the final polymeric sheet exploiting capillarity filling and UV curing. This double-step replication process allows for the sequential multiplication of the obtained devices: at every replica-step one "mother mold" is reproduced with inverted tone in many "daughter devices". FIG. 2 is a schematic of the process.

Silicon (100) wafer, structured as previously reported, are used as starting substrate (FIG. 2A). The remaining oxide layer, after wet etching, is again used as the masking layer for an etching process. Spin coating of positive photo-resist (same as before, i.e. AS 5214E) and UV lithography will produce after development aligned opening in between two consecutive mirrors. A switched plasma etching process [75] in an ICP reactor will then transfer the pattern into the silicon, without affecting the mirroring surfaces due to the protective resist layer: switched processes (also known as Bosch process) are optimized for high selectivity of silicon toward the protective resist layer. After removing of both resist and oxide, the structured silicon mould presents micro-wells enclosed by mirrors. From this first generation mould, a second generation of intermediate molds is then produced by PDMS casting and curing. In order to increase the quality of the PDMS replica and the life-time of the silicon mould, an anti-stick layer is introduced to silicon surface by mean of vapor phase silanization [76]. Many replicas could be produced with a single silicon mould, allowing for a fabrication scheme targeting high throughput (2c). The PDMS intermediate mould is then used to produce the final device. PDMS is pressed in contact to a glass cover slide, to which it sticks enough to define connected cavities, accessible by the open ending of each groove. Capillarity is then exploited to fill these cavities by a UV-curable liquid polymer. Exposure to UV through the glass cover slide ends with the curing of the polymer and thus the achievement of a self-standing polymeric sheet with micro-wells laterally enclosed by 45° slanted surfaces. The last fabrication step is the coating of this sheet with a metallic layer. The sheet is inserted into an UHV metal evaporator, with the mirroring surfaces oriented to the evaporation source. Different metals could be used, that produce the final required reflectivity, but Cr is normally the preferred one because of its good adhesive properties also with plastic materials. A layer of 30-50 nm thick Cr is deposited by mean of thermal or E-gun evaporation (FIG. 2D). Since the sheet does not present top or bottom capping walls, Cr does not deposit inside the wells: vertical walls are usually very well preserved from deposition by the geometry of a UHV deposition chamber. The device is subsequently flipped on a coverslip and the groves interstices are filled with a UV curable resist and cured. It provides a protective layer to the mirrors. The wells are left empty since they do not reach out of the device. A final metal etching step is used to remove the potential metallic coatings inside the wells. Proper standard etching reagent is used depending on the coating metal used.

soSPIM Beam Steering System

The soSPIM excitation beam steering system (FIG. 4A-C) was adapted on a conventional inverted microscope (inverted Nikon Ti-E). Illumination lasers (405 nm@200 mW, 488 nm@200 mW, 561 nm@200 mW and 635 nm@175 mW) were collimated and collinearly combined via dichroic beam splitters and coupled into a single mode optical fiber for spatial filtering and convenient alignment. An acousto-optic tunable filter (AOTF) was used to select one or more wavelengths, control intensities and provide on-off modulation. An achromatic reflective collimator (Thorlabs RC02APC-P01) was used to produce a collimated 2 mm wide laser beam at the output of the optical fiber for all lasers. A laser beam telescopic expander, (Thorlabs AC254-050-A, focal length 50 mm and Thorlabs AC254-100-A, focal length 100 mm) providing a 2× magnification of the excitation beam may be inserted into the optical path to vary the diameter, or numerical aperture, of the excitation beam.

The laser beam is sent to an x-axis galvanometric mirror (XG), which is imaged onto a conjugated y-axis galvanometric mirror (YG) by relay lenses (Thorlabs AC254-050-A, focal length 50 mm both). The laser beam is then imaged on a focus tunable lens (VL) (Optotune, Custom EL-30-10 focal lens from −80 mm to +1000 mm) by relay lenses (Thorlabs, AC245-050-A, focal length 50 mm both). The focus tunable lens is finally imaged and centered onto the back focal plane (BFP) of a high numerical aperture microscope objective (CFI Plan Apochromat VC 60× WI N.A. 1.20, or CFI Plan Apochromat VC 100× Oil N.A. 1.40, Nikon) by a third telescope (Thorlabs, AC254-150-A and the tube lens of the microscope, focal length 150 mm both). These successive conjugations and centering steps enable a laser beam to be obtained that is collinear to the optical axis of the microscope objective when imaged through the objective, regardless of its radial position in the image plane.

A sample holder with 45° micro-mirroring surfaces on top of the objective enables the excitation beam to reflect perpendicular to the optical axis of the objective. Scanning the excitation beam along the Y-direction enables the creation of a light sheet that penetrates the sample perpendicular to the optical axis of the microscope objective. Displacing the excitation beam along the X-direction in turn enables the depth at which the light sheet penetrates into the sample to vary. The sample holder is placed on an axial translation piezo stage (Physik Instrument, P-736 Plnano-200 µm) that enables the objective focal plane to be positioned according to the depth of the light sheet (FIG. 4B).

For super-resolution acquisition a cylindrical lens (CL) (Thorlabs ACY254-150-A, focal length 150 mm) is inserted into the excitation path. This enables the laser beam to focus in a single direction onto the BFP of the objective, creating a continuous illumination light sheet without scanning the laser beam on the mirror. The cylindrical lens is mounted in a rotational mount in order to align the large dimension of the light sheet with the long axis of the mirror, if needed.

The fluorescence signal is collected by the microscope tube lens, through the same high numerical aperture objective and captured with an EMCCD camera (Evolve 512, Photometrics). For super resolution acquisition, we used the 100× oil objective. This allowed us to optimize the pixel size in the imaging plane to 160 nm.

Figure 4A:
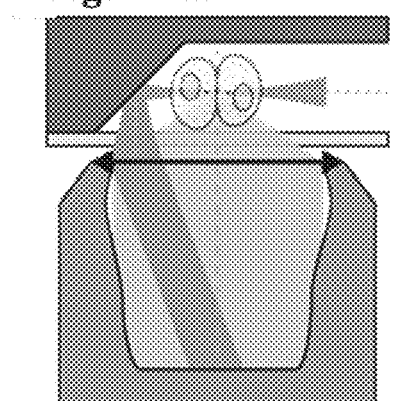
FIGS. 4A-4C illustrate the soSPIM principle. (A) Schematic representation of the soSPIM principle composed of a micro-fabricated sample-holder displaying 45° micro-mirroring surfaces on a conventional coverslip, an excitation beam steering system and an optical detection path that allows the positioning of the mirror and the fluorescence signal detection. (B) Representation of the sectioning capabilities produced by the displacement ($\Delta x$) of the excitation beam along the mirror combined with the axial positioning of the objective ($\Delta z$) and the defocusing of the excitation beam ($\delta f$) to maintain the position of the light sheet thinnest part on the biological sample. (C) Schematic representation of the beam steering system. Light from the lasers (L1-3) is reflected by an x-axis galvanometric (XG) mirror and transmitted in turn by relay lenses (RL) to a y-axis galvanometric mirror (YG) and a focus tunable lens (VL). A cylindrical lens (CL) can be inserted into the optical path for direct light sheet creation. (XG), (YG), (VL) are all conjugated to the back focal plane (BFP) of the objective so that the excitation beam is always emitted parallel to the objective optical axis. Finally a telescope (TL) enables the beam diameter to vary at the BFP.
Figure 4B:
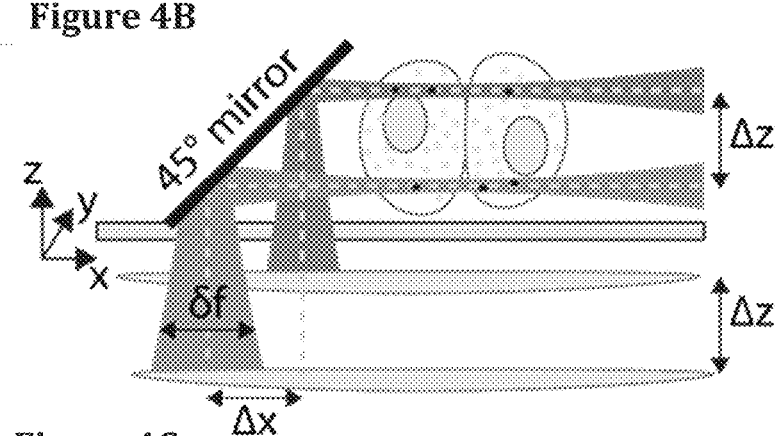
Figure 4C:
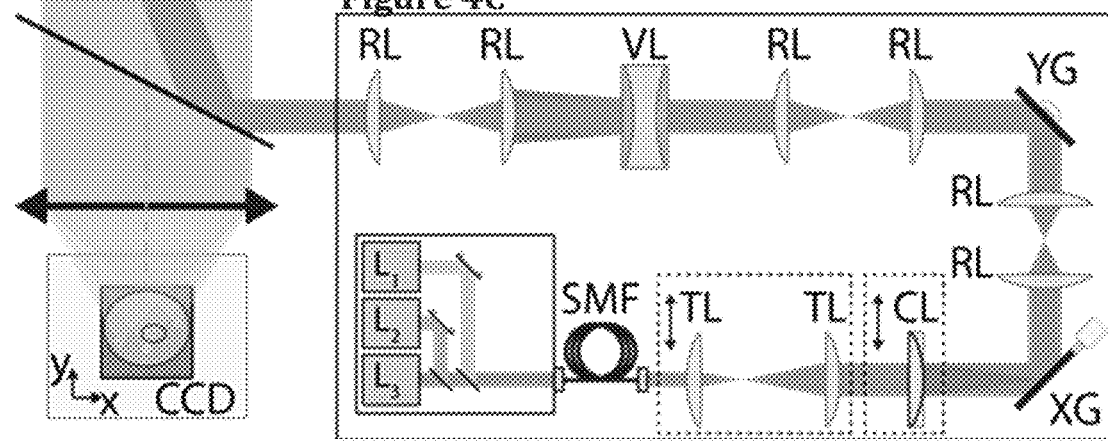

A second CCD camera (Hamamatsu, Orca Flash 2.8) coupled with a 0.45× magnification lens (Nikon), which provides a large field of view, was used to position and image the 45° micro-mirror according to the sample (FIG. 4A). This camera was also used to define both the scanning direction of the excitation beam, in order to create the light sheet depending of the orientation of the mirror, and the movement of the light sheet along the perpendicular axis of the mirror, to vary its final depth into the sample. The position of the micro-mirror outside the field of view of the EMCCD allows for both an increase in the available field of view for imaging, and a decrease in the background noise created by the reflection of the excitation beam onto the micro-mirror.

Light Sheet Positioning and Synchronization

The light sheet, created by scanning a focussed Gaussian beam, or by the focussing of a Gaussian beam through a cylindrical lens, could be considered as the volume 2ω0× 2ZR×1 surrounding the focalization point of the excitation beam, where □0 and ZR are the waist and the Rayleigh length of the excitation beam respectively, and 1 the width given either by the scanning properties or by the cylindrical lens[78]. In a common SPIM architecture, the light sheet is positioned on the focal plane of the excitation objective. However, in the soSPIM architecture, this would mean the light sheet is localized on the reflection point of the excitation beam on the 45° micro-mirror. In order to displace the light sheet away from the micro-mirror and position it on the biological sample, a defocusing system has been implemented. It is composed of a divergent lens with a fast, electrically driven tunable focusing mechanism. (Optotune, Custom EL-10-30-C-VIS-LD). The focal range of this system is from +1000 mm to −80 mm conjugated to the BFP of the objective. This system enables the position of the light sheet to vary up to 280/260 µm from the micro-mirror position, which is in agreement with the field of view of a 60×/100× magnification objective respectively. Such a defocusing system enables the light sheet to be positioned on the biological sample regardless of its position in the field of view of the EMCCD camera. The visualisation of the excitation beam through a fluorescent solution enabled the precise calibration of the beam in relation to the position of the light sheet, according to the micro-mirror, and the focal length of the tunable lens.

Figure 5A:
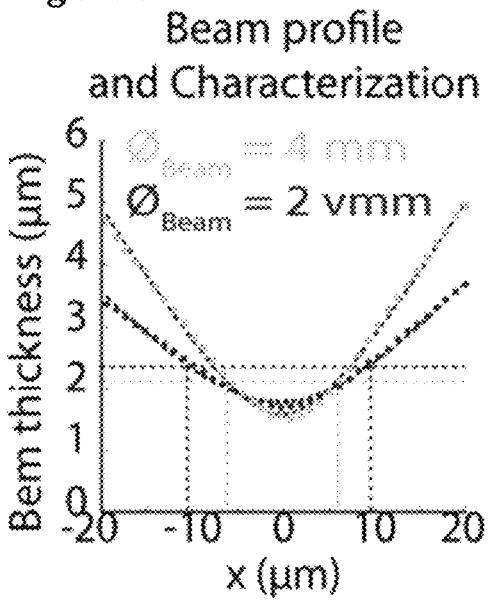
FIGS. 5A-5C illustrate the characterization of the beam thickness and of the defocusing system. (A) Axial beam profile for an excitation beam with a 4 mm (grey dots) and 2 mm (black dots) diameter at the BFP of a 60× water immersion objective (NA=1.2) and their respective fit with the Gaussian beam propagation equation (black dotted line). Dotted grey (resp. black) lines represent the field of view of the light sheet defined by 2 times de Rayleigh length for an excitation beam with 4 mm (resp. 2 mm) diameter at the BFP. (B) Axial beam profile for different divergence strength of the electrically driven variable focal lens (VL). The position of the focal point can be adjusted by dynamically changing the divergence of the laser beam without change in the width and length of the laser sheet. (C) Linear dependence of the position of the focalization point of the excitation beam, ie the thinnest part of the light sheet, with the current in the electrically driven variable focal lens.
Figure 5B:
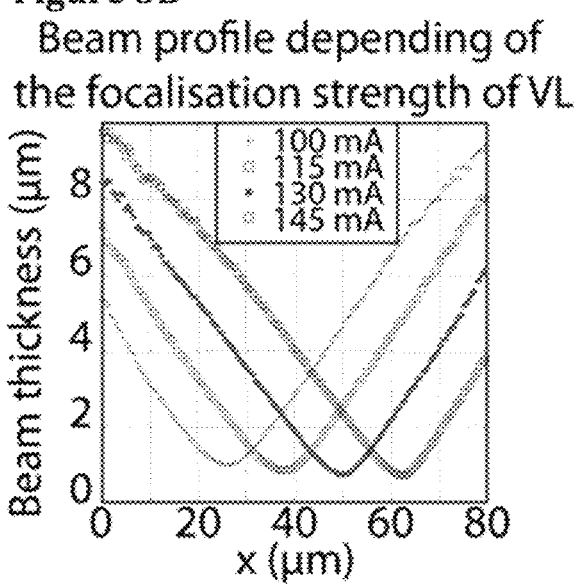
Figure 5C:
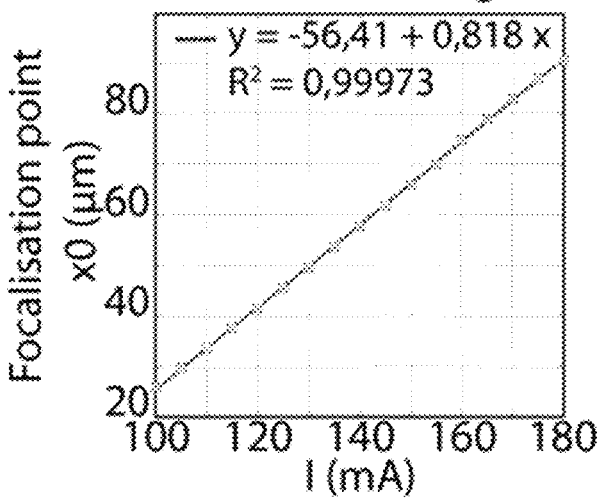
Figure 6A:
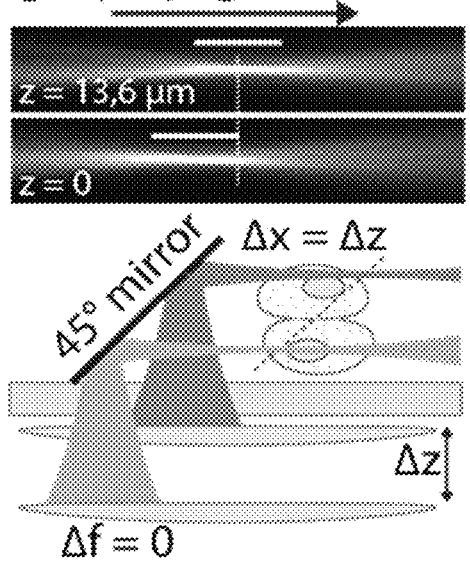
FIGS. 6A-6D: illustrate deviation compensation of the light sheet position. (A) Upper panel: Excitation beam visualized through a fluorescent solution at two different depths ($\Delta z$) within the sample as represented on the scheme on the lower panel without defocusing compensation ($\Delta f=0$) for the axial movement of the objective. (B) Light sheet profiles at different depths within the sample without compensation for the axial movement of the objective. (C) Upper panel: Excitation beam visualized through a fluorescent solution at two different depths ($\Delta z$) within the sample as represented on the scheme on the lower panel with defocusing compensation ($\Delta f \alpha \Delta z$) for the axial movement of the objective. (D) Light sheet profile at different depths within the sample after compensating for the axial movement of the objective. Scale bars correspond to the length of the light sheet (22.4 µm) and are positioned at the level where the light sheet is at its thinnest.
Figure 6B:
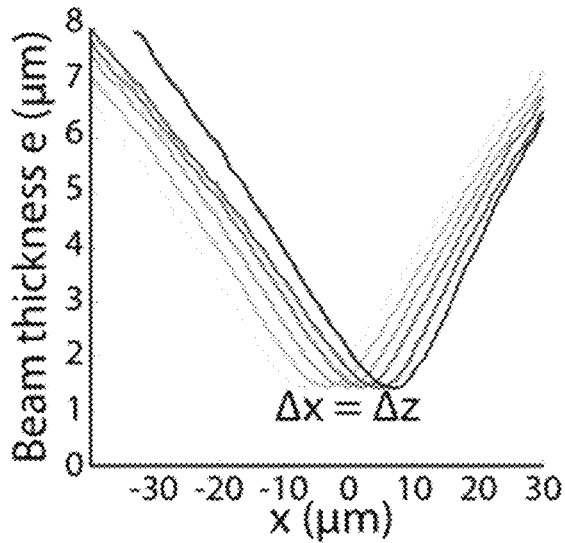
Figure 6C:
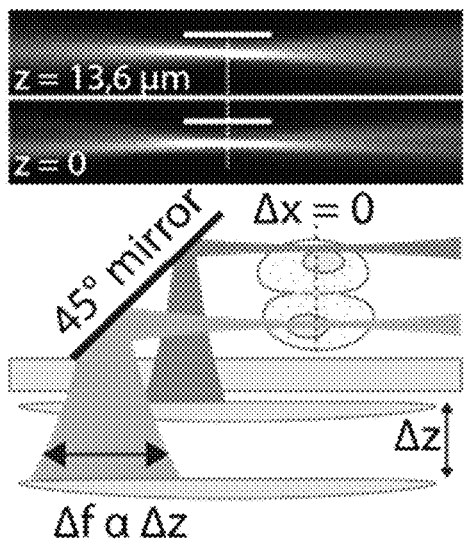
Figure 6D:
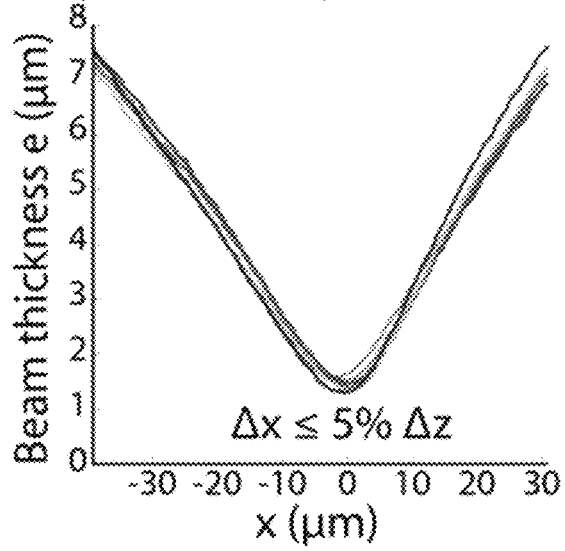
Figure 7A:
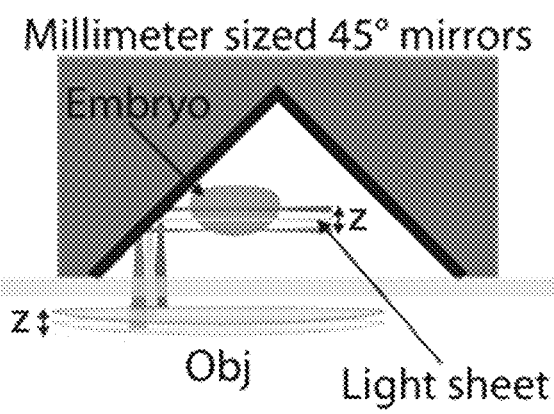
FIGS. 7A-7D illustrate 3D volume imaging of whole Drosophilia Embryos. (A) Schematic representation of the soSPIM principle for imaging thick samples such as *Drosophila* embryos with millimetre sized microfabricated 45° mirrors. The *Drosophila* embryos are embedded, at different development stages, in 1% low melting point agar gel between two metalized 45° mirrors and imaged with the soSPIM microsope. (B) Two colours soSPIM optical sections of a *drosophila* embryo expressing the membrane protein CAP43-Venus (upper panel) and the nuclear protein Histone-mCherry (lower panel) taken with a 10× magnification objective (NA=0.3) and a 5.2 µm thick light sheet. (C) Two colours soSPIM optical sections of a *drosophila* embryo (upper panel: CAP43-Venus; lower panel: Histone-mCherry) taken with a 20× magnification objective (NA=0.5) and a 4.3 µm thick light sheet. (D) Two colours soSPIM optical sections of a drosophilia embryo (upper panel: CAP43-Venus; lower panel: Histone-mCherry) taken with a 40× magnification objective (NA=0.75) and a 3.1 µm thick light sheet.
Figure 7B:
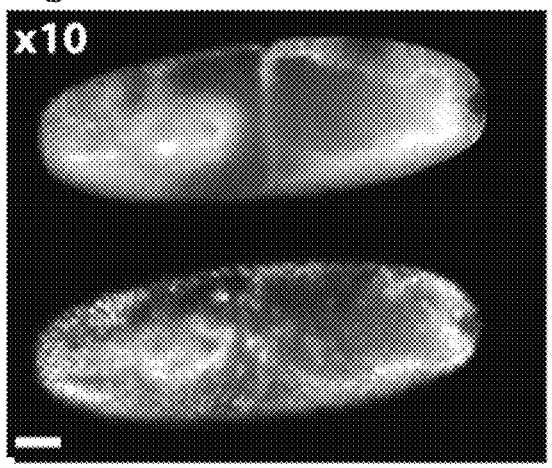
Figure 7C:
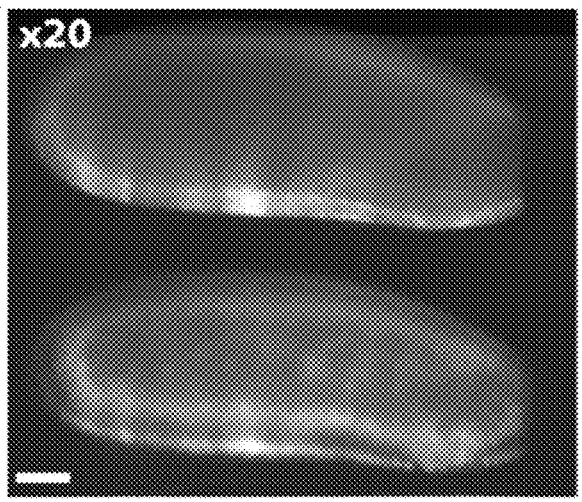
Figure 7D:
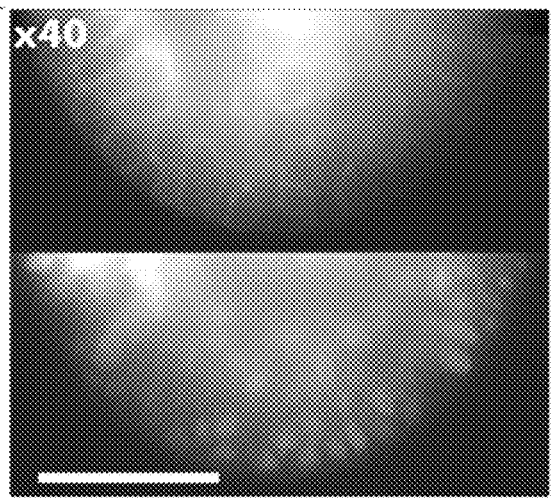

Moreover, the focus tunable lens is used to compensate for the displacement of the light sheet position, which may result from the axial movement of the objective when changing the imaging plane depth. Indeed, without compensation, the radial displacement of the light sheet position will be equal to the axial displacement of the objective (FIG. 5A-B). In order to ensure the thinnest part of the light sheet is always positioned on the biological sample, we compensate the displacement of the objective by focusing the excitation beam according to the movement of the objective (FIG. 5C-D). This compensation ensures the light sheet displacement is less than 5% for imaging planes ranging from 0 to 40 µm.

Beam Alignment and Characterization

Precise conjugation and centering of the XG and YG galvanometers, as well as the focus tunable lens, was carried out according to the BFP of the objective. This is essential in ensuring the light sheet is perpendicular to the optical axis of the microscope objective after reflection on the 45° micro-mirrors, regardless of its reflection position on the micro-mirror. Conjugation was achieved by collimating the laser beam after each relay lens with a shearing interferometer (Shear plate SI035, Thorlabs) mounted in place of the microscope objective. Aligning the optical elements with the center of the objective BFP was achieved by iterative centering steps between the BFP and the image of the beam reflected off a flat mirror that was positioned perpendicular to the microscopes optical axis at the BFP. Slight deviations from the 45° angle of the micro-mirror with respect to the optical axis of the microscope objective was compensated for by slightly decentering the laser beam on the BFP without modifying the conjugations.

Microfabrication Process

The fabrication process of the silicon chips displaying 45° micro-mirroring surfaces and micro-wells is represented in FIG. 3. The micro-mirroring surfaces are produced in oriented silicon wafers by anisotropic etching in alkaline solutions (such as KOH or TMAH). The 45° surfaces are achieved by preventing a fast etching of oriented crystal planes with the use of a surfactant, which acts as a preferential protection layer[48, 49, 79]. By tuning the etching conditions (i.e. alkaline and surfactant concentration and temperature of the etching bath), it is possible to reduce the etching rate of planes to be slower than for <100>, while the <111> always remain as the slowest. If the open areas on the wafer, cleared for the etching, are oriented on the plane 45° away from the <110> reference flat of the wafer, then the exposed <110> planes are preserved and the progressive etching of <100> planes reveals a cavity flanked by exactly 45° slanted surfaces.

The silicon wafer displaying 45° grooves could then be directly used as a mirroring device, as represented in FIG. 3A. In this case, a drop of suspended cells was deposited on a clean #1.5 coverslip and the silicon device was pressed in close contact onto the coverslip and sealed with common varnish.

Figure 1C:
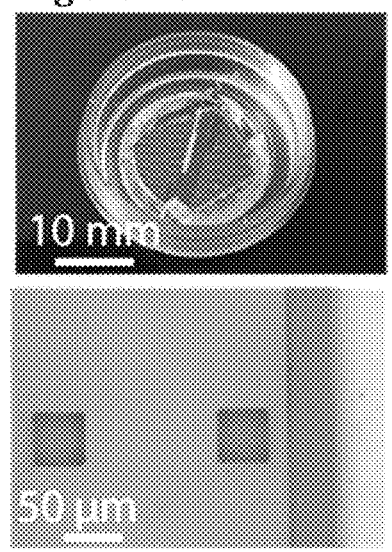

A more sophisticated approach consists of designing a polymer-based device with micro-wells flanked by 45° micro-mirrors, as described in FIG. 3B and represented in FIG. 3C-D. After producing the 45° surfaces as discussed, micro-wells were realized by dry etching (FIG. 3B-i). The silicon wafer is then replicated in PDMS (184 Sylgard, Dow Corning), which can be used tens of times for the production of plastic devices with a UV-curable polymer coated onto standard coverslips (NOA polymer, Norland product), when a capillary filling process is implemented (FIG. 3B-ii and iii). To increase the reflectivity of the plastic surface, a Cr layer is deposited by thermal evaporation in an ultra-high vacuum chamber (FIG. 3B-vi). The micro-mirrors are finally protected by a second layer of UV-curable polymer and the metal coating within the micro-wells is removed by wet etching (FIG. 3B-v). The device is then washed several times with ultra-pure water and incubated overnight with 0.2× Pluronic solution (F127, Sigma) for surface passivation. The coverslips are finally sealed in a bottom free 35 mm plastic-dish that allows easy cell culture within the device (FIG. 1C).

Cell Culture, Transfection and Imaging

S180 cells stably expressing E-Cadherin-GFP were a kind gift of Jean-Paul Thiery (Institute of Molecular Cell Biology, A*STAR). A clonal U2-OS stable cell line expressing pDendra2-Fibrillarin (Evrogen, Cat#FP826-d, dendra2 fused to N-terminus of fibrillarin) was established with the U2-OS osteosarcoma cell line (ATCC HTB-96). This was maintained at 37° C. in a 5% CO2-humidified incubator. One day prior transfection, 6 well dishes were plated at 1.2×105 cells/dish. Cells were transfected in CM-Mc medium using jetPRIME DNA transfection reagent (Polyplus Transfection) in a 1:2 ratio. The following day, transfected cells were transferred into 15 cm diameter culture dishes. Clone selection was then performed in CM-Mc containing 0.4 mg/mL of G418. Ten to fifteen days after transfection, clones were chosen under a fluorescence microscope, to ensure reliable and proper fluorescence localization. Selected clones were then isolated and transferred to 24 well dishes for expansion and frozen in culture medium containing 10% DMSO. Further selection with G418 was omitted after the next thawing without any loss of fluorescence.

S180 cells were cultured in High-Glucose DMEM (Sigma) supplemented with 10% FBS (Sigma), 1% GlutaMAX (Sigma) and 1% penicillin/streptomycin (Sigma). U2-OS cells were cultured in CM-MC medium composed of McCoy's 5A medium (Life Technologies), supplemented with 10% FBS (Sigma), 1% GlutaMAX (Sigma), 1% non-essential amino acids (Life technologies), and 1% penicillin/streptomycin (Sigma).

The day before imaging, S180 cells were cultured in 35 mm plastic dishes to ensure they reached 70% confluency the day of imaging. The cells were then washed two times with 1×PBS (Sigma) and immersed in 1 mL CO2 independent cell culture medium, which was used as imaging medium. The cells were detached mechanically by pipetting the culture medium several times and placed in an incubator for 10 min. A drop of the suspended cells was then deposited on a clean coverslip and a silicon mask displaying 45° micro-mirroring surfaces was pressed and sealed onto the coverslips with varnish. The cells were directly imaged on the microscope. For experiments using microwells, a drop of suspended cells was deposited in the microwells and the device was placed in the incubator for 10 to 20 min, allowing the cells to fill the microwells. The microwells were then washed one time with imaging medium and filled with 2 mL of new imaging medium before being placed on the microscope.

U2-OS cells were fixed in −20° C. methanol on the day of imaging. Once detached by a 0.2× Trypsin solution (Sigma diluted in PBS) the cells were allowed to round up in the incubator for 10 min in complete medium. The cells were then centrifuged for 3 min at 1000 rpm and re-suspended in PBS for washing. They were centrifuged again for 3 min at 1000 rpm and re-suspended in −20° C. methanol for 5 min at −20° C. The cells were then washed 2 times in PBS and re-suspended in PBS for imaging as described earlier.

Image Acquisition and Processing for Super-Resolution Imaging

Images were acquired on a regular inverted microscope (Nikon TiE) adapted for soSPIM illumination. Images were collected in streaming mode with an EMCCD camera (Evolve 512, Photometrics). The acquisition was steered via the MetaMorph software (Molecular Devices). The beam steering system, described in the soSPIM set-up section, was synchronized using custom software within MetaMorph. A 405 nm photoactivation laser and a 561 nm excitation laser were used and directed toward the objective with a custom dual band cube filter (Exc: ZET 405/488/561x triple band laser, Dichroique: ZT 405/488/561 rpc triple band laser, Em: ZET 488/561 double band laser tirf, Chroma). Single-molecule localization and super-resolution image reconstruction was achieved using the WaveTracer module 20 and a wavelet-based analysis method 21.

EXAMPLE 1

We used this device to perform selective plane illumination through a single objective to image a full *drosophila* embryo at various magnifications (10×, 20×, 40×) (FIG. 7). The transverse illumination is performed either by a scanning a single beam or a static sheet light that is steered in the horizontal plane. Due to the 45° reflection it results in an horizontal plane illumination of the sample placed in the well by the selective plane illumination. The fluorescence signal is collected through the same objective. This device allows us to transform any standard microscope into a SPIM microscope provided that the right illumination shaping is implemented. In particular the control of the dynamic defocalisation of the laser beam is crucial to ensure the focalisation of the laser sheet onto the optical axis of the objective. The implementation is illustrated in FIG. 5.

EXAMPLE 2

As a second example we demonstrate how 3D imaging of single cell doublets can be achieved using wells of appropriate sizes (FIG. 8). We demonstrate how a single high numerical aperture objective can be used to produce 3D optical sectioning by SPIM with disposable coverslips as well as a specific beam steering add-on unit. The light sheet diameter was set to obtain the best optical contrast depending of the size of the cells.

Figure 9:
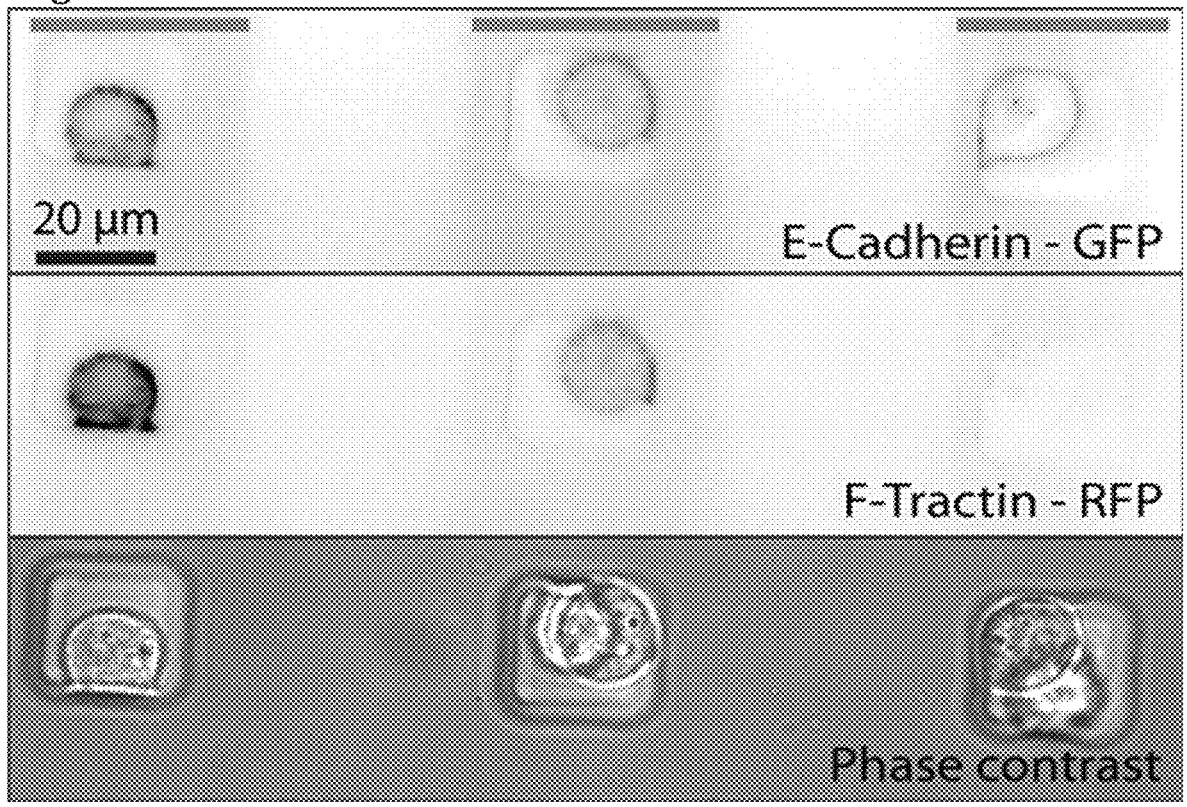
FIG. 9: illustrates 3D volume imaging at the cellular level within micro-wells. (A) Simultaneous two colours soSPIM optical sections of three S180 cells expressing the membrane protein E-Cadherin-GFP (upper panel) and the cortical actin protein F-Tractin-RFP (middle panel) positioned each in a different 24×24 µm² micro-well. The scanning light-sheet illuminates only the zones defined by the red bars and the readout speed of the camera is equivalent to single well imaging. The lower panel is a phase contrast image of the three wells. Scale bars are 5 µm.

The axial extension of the light sheet was modified by adjusting the beam size at the back focal plane of the objective (FIG. 5A). In this study, we used light sheets ranging from 23×30×1.8 μm (length×width×thickness) to 13×30×1.5 μm with a 60×WI 1.2 NA objective at a distance of 10 to 100 μm from the micro-mirror. The light sheet thickness compares favorably with those obtained for single cell SPIM (IML-SPIM 8: 1.8 to 4 μm; Bessel beam 9: 0.5 to 1 μm; iSPIM 11: 1.2 μm; RSLM 12: 1 μm). Images of a single cell or cell doublets is illustrated on FIG. 8A-B. Sectionning capabilities equal that of Spinning disc microscopy in terms of resolution and imaging speed. Simultaneous imaging of 3 cells in 3 different wells can also be achieved and is demonstrated in FIG. 9.

EXAMPLE 3

We further demonstrated the capability of the device to perform super resolution imaging deep in the sample (FIG. 8C-G). Live S180 cell doublets labeled with E-Cadherin-GFP, and U2-OS cells stably expressing fibrilarin-Dendra2 were used. We demonstrated that soSPIM is capable of achieving single-molecule-based super-resolution microscopy in 3D, up to 30 μm above the coverslips, using PALM[7,9]. In this case, Fibrilarin-Dendra2 photoconvertible proteins were simultaneously converted at 405 nm and excited at 561 nm by the multi-wavelength light sheet.

Due to the high numerical aperture objective, as well as the perpendicular illumination, which permitted a specific and confined, activation, single-molecule detection with high signal to noise ratio was achieved. We successfully reconstructed super-resolution intensity images of nucleoli in suspended U2-OS cells ten microns above the coverslip. FIG. 8C were taken on planes (7.2 µm and 8.6 µm) above the coverslip. The super-resolution images were reconstructed from 4,433 (resp. 2,137) single-molecule localizations extracted from 8,000 frames of 80×80 pixels acquired at 40 fps (FIG. 8E-F). This revealed sub-nuclear structures below the diffraction limit. The median number of photons above the background per localization event was measured to 141.3 leading to a theoretical lateral resolution of 38.2 nm (FIG. 8F). This resolution compares to that of other super-resolution methods, including SPIM[19,77] but is lower than conventional PALM when imaging close to the coverslip. This is mainly due to optical aberrations arising from imaging in 3D, deep in the sample. It is not inherently stemming from the illumination scheme.

The axially confined photoconversion and excitation at the focal plane of the objective is a major advantage of the SPIM approach since it allows single-molecule imaging with low background in thick samples. Additionally, single objective SPIM overcomes the mechanical constraints of bringing two objectives close to the sample. This permits the use on a standard microscope of any objective type, including those with high numerical aperture. However, this simplification requires both the sample and the micro-mirrors to be brought within the field of view of the objective. Our current set-up, which uses a 100× objective, allows the imaging of single cells that are located 10 to 100 microns away from the 45° reflective surfaces. We tamed this constraint by designing arrayed wells that lined the micromirrors, thus constraining the cell location.

REFERENCES

1. B. Huang, M. Bates, X. Zhuang, Super-resolution fluorescence microscopy. *Annual review of biochemistry* 78, 993 (2009).
2. S. J. Lord, H. L. Lee, W. E. Moerner, Single-molecule spectroscopy and imaging of biomolecules in living cells. *Anal Chem* 82, 2192 (Mar. 15, 2010).
3. P. Sengupta, S. Van Engelenburg, J. Lippincott-Schwartz, Visualizing cell structure and function with point-localization superresolution imaging. *Dev Cell* 23, 1092 (Dec. 11, 2012).
4. T. D. Harris et al., Single-molecule DNA sequencing of a viral genome. *Science* 320, 106 (Apr. 4, 2008).
5. J. Korlach et al., Real-time DNA sequencing from single polymerase molecules. *Methods in enzymology* 472, 431 (2010).
6. B. N. Giepmans, S. R. Adams, M. H. Ellisman, R. Y. Tsien, The fluorescent toolbox for assessing protein location and function. *Science* 312, 217 (Apr. 14, 2006).
7. E. Betzig et al., Imaging intracellular fluorescent proteins at nanometer resolution. *Science* 313, 1642 (Sep. 15, 2006).
8. M. J. Rust, M. Bates, X. Zhuang, Sub-diffraction-limit imaging by stochastic optical reconstruction microscopy (STORM). *Nat Methods* 3, 793 (October, 2006).
9. S. T. Hess, T. P. Girirajan, M. D. Mason, Ultra-high resolution imaging by fluorescence photoactivation localization microscopy. *Biophys J* 91, 4258 (Dec. 1, 2006).
10. M. Heilemann et al., Subdiffraction-resolution fluorescence imaging with conventional fluorescent probes. *Angew Chem Int Ed Engl* 47, 6172 (2008).
11. J. Folling et al., Fluorescence nanoscopy by ground-state depletion and single-molecule return. *Nat Methods* 5, 943 (November, 2008).
12. S. W. Hell, Far-field optical nanoscopy. *Science* 316, 1153 (May 25, 2007).
13. J. Lippincott-Schwartz, S. Manley, Putting super-resolution fluorescence microscopy to work. *Nat Methods* 6, 21 (January, 2009).
14. B. Huang, W. Wang, M. Bates, X. Zhuang, Three-dimensional super-resolution imaging by stochastic optical reconstruction microscopy. *Science* 319, 810 (Feb. 8, 2008).
15. M. F. Juette et al., Three-dimensional sub-100 nm resolution fluorescence microscopy of thick samples. *Nat Methods* 5, 527 (June, 2008).
16. A. G. York, A. Ghitani, A. Vaziri, M. W. Davidson, H. Shroff, Confined activation and subdiffractive localization enables whole-cell PALM with genetically expressed probes. *Nat Methods* 8, 327 (April, 2011).
17. S. R. Pavani et al., Three-dimensional, single-molecule fluorescence imaging beyond the diffraction limit by using a double-helix point spread function. *Proc Natl Acad Sci USA* 106, 2995 (Mar. 3, 2009).
18. J. Folling et al., Fluorescence nanoscopy with optical sectioning by two-photon induced molecular switching using continuous-wave lasers. *Chemphyschem: a European journal of chemical physics and physical chemistry* 9, 321 (Feb. 1, 2008).
19. F. Cella Zanacchi et al., Live-cell 3D super-resolution imaging in thick biological samples. *Nat Methods* 8, 1047 (December, 2011).
20. T. A. Planchon et al., Rapid three-dimensional isotropic imaging of living cells using Bessel beam plane illumination. *Nat Methods* 8, 417 (May, 2011).
21. L. Gao et al., Noninvasive imaging beyond the diffraction limit of 3D dynamics in thickly fluorescent specimens. *Cell* 151, 1370 (Dec. 7, 2012).
22. R. Y. Tsien, The green fluorescent protein. *Annual review of biochemistry* 67, 509 (1998).
23. E. Abbe, E. Beitrage zur Theorie des Mikroskops and der mikroskopischen Wahrnehmung. *Arch. Mikr. Anat.* 9, 413 (1873).
24. S. W. Hell, J. Wichmann, Breaking the diffraction resolution limit by stimulated emission: stimulated-emission-depletion fluorescence microscopy. *Opt Lett* 19, 780 (Jun. 1, 1994).
25. T. A. Klar, S. Jakobs, M. Dyba, A. Egner, S. W. Hell, Fluorescence microscopy with diffraction resolution barrier broken by stimulated emission. *Proc Natl Acad Sci USA* 97, 8206 (Jul. 18, 2000).
26. M. G. Gustafsson, D. A. Agard, J. W. Sedat, I5M: 3D widefield light microscopy with better than 100 nm axial resolution. *J Microsc* 195, 10 (July, 1999).
27. R. Heintzmann, T. M. Jovin, C. Cremer, Saturated patterned excitation microscopy—a concept for optical resolution improvement. *Journal of the Optical Society of America. A, Optics, image science, and vision* 19, 1599 (August, 2002).
28. M. G. Gustafsson, Nonlinear structured-illumination microscopy: wide-field fluorescence imaging with theoretically unlimited resolution. *Proc Natl Acad Sci USA* 102, 13081 (Sep. 13, 2005).

29. A. Sharonov, R. M. Hochstrasser, Wide-field subdiffraction imaging by accumulated binding of diffusing probes. *Proc Natl Acad Sci USA* 103, 18911 (Dec. 12, 2006).
30. G. Giannone et al., Dynamic superresolution imaging of endogenous proteins on living cells at ultra-high density. *Biophys J* 99, 1303 (Aug. 9, 2010).
31. J. Gelles, B. J. Schnapp, M. P. Sheetz, Tracking kinesin-driven movements with nanometre-scale precision. *Nature* 331, 450 (Feb. 4, 1988).
32. U. Kubitscheck, O. Kuckmann, T. Kues, R. Peters, Imaging and tracking of single GFP molecules in solution. *Biophys J* 78, 2170 (April, 2000).
33. R. E. Thompson, D. R. Larson, W. W. Webb, Precise nanometer localization analysis for individual fluorescent probes. *Biophys J* 82, 2775 (May, 2002).
34. S. Manley et al., High-density mapping of single-molecule trajectories with photoactivated localization microscopy. *Nat Methods* 5, 155 (February, 2008).
35. M. Bates, B. Huang, G. T. Dempsey, X. Zhuang, Multicolor super-resolution imaging with photo-switchable fluorescent probes. *Science* 317, 1749 (Sep. 21, 2007).
36. M. Fernandez-Suarez, A. Y. Ting, Fluorescent probes for super-resolution imaging in living cells. *Nat Rev Mol Cell Biol* 9, 929 (December, 2008).
37. G. Shtengel et al., Interferometric fluorescent super-resolution microscopy resolves 3D cellular ultrastructure. *Proc Natl Acad Sci USA* 106, 3125 (Mar. 3, 2009).
38. I. Izeddin et al., Wavelet analysis for single molecule localization microscopy. *Opt Express* 20, 2081 (Jan. 30, 2012).
39. N. Hoze et al., Heterogeneity of AMPA receptor trafficking and molecular interactions revealed by superresolution analysis of live cell imaging. *Proc Natl Acad Sci USA* 109, 17052 (Oct. 16, 2012).
40. M. Heidbreder et al., TNF-alpha influences the lateral dynamics of TNF receptor I in living cells. *Biochimica et biophysica acta* 1823, 1984 (October, 2012).
41. J. B. Sibarita, M. Heilemann, Targeting, resolving and quantifying cellular structures by single-molecule localization microscopy. *EMBO reports* 13, 1043 (Nov. 30, 2012).
42. O. Rossier et aL, Integrins beta(1) and beta(3) exhibit distinct dynamic nanoscale organizations inside focal adhesions. *Nat Cell Biol* 14, 1057 (Sep. 30, 2012).
43. J. B. Sibarita, C. U. B. Segalen, Ed. (World, 2012).
44. I. Izeddin et al, PSF shaping using adaptive optics for three-dimensional single-molecule super-resolution imaging and tracking. *Opt Express* 20, 4957 (Feb. 27, 2012).
45. D. Bartolo, G. Degre, P. Nghe, V. Studer, Microfluidic stickers. *Lab on a Chip* 8, 274 (2008).
46. T. Masters et al., Easy fabrication of thin membranes with through holes. Application to protein patterning. *PLoS One* 7, e44261 (2012).
47. J. H. Lee, W. S. Choi, K. H. Lee, J. B. Yoon, A simple and effective fabrication method for various 3D microstructures: backside 3D diffuser lithography. *Journal of Micromechanics and Microengineering* 18, 125015 (2008).
48. C. Strandman, L. Rosengren, H. G. A. Elderstig, Y. Backlund, Fabrication of 45 degrees mirrors together with well-defined V-grooves using wet anisotropic etching of silicon. *J Microelectromech S* 4, 213 (December, 1995).
49. I. Barycka, I. Zubel, Silicon Anisotropic Etching in Koh-Isopropanol Etchant. *Sensor Actuat a-Phys* 48, 229 (May 30, 1995).
50. J. Huisken, J. Swoger, F. Del Bene, J. Wittbrodt, E. H. Stelzer, Optical sectioning deep inside live embryos by selective plane illumination microscopy. *Science* 305, 1007 (Aug. 13, 2004).
51. J. Huisken, D. Y. Stainier, Selective plane illumination microscopy techniques in developmental biology. *Development* 136, 1963 (June, 2009).
52. Y. Lin, W. Seka, J. H. Eberly, H. Huang, D. L. Brown, Experimental investigation of Bessel beam characteristics. *Applied optics* 31, 2708 (May 20, 1992).
53. J. E. Sillibourne et al., Assessing the localization of centrosomal proteins by PALM/STORM nanoscopy. *Cytoskeleton (Hoboken)* 68, 619 (November, 2011).
54. L. Holtzer, T. Meckel, T. Schmidt, Nanometric three-dimensional tracking of individual quantum dots in cells. *Applied Physics Letters* 90, 053902 (2007).
55. M. K. Cheezum, W. F. Walker, W. H. Guilford, Quantitative comparison of algorithms for tracking single fluorescent particles. *Biophys J* 81, 2378 (October, 2001).
56. S. Wolter et aL, Real-time computation of subdiffraction-resolution fluorescence images. *J Microsc* 237, 12 (January, 2010).
57. R. Henriques et al., QuickPALM: 3D real-time photoactivation nanoscopy image processing in ImageJ. *Nat Methods* 7, 339 (May, 2010).
58. P. N. Hedde, J. Fuchs, F. Oswald, J. Wiedenmann, G. U. Nienhaus, Online image analysis software for photoactivation localization microscopy. *Nat Methods* 6, 689 (October, 2009).
59. C. S. Smith, N. Joseph, B. Rieger, K. A. Lidke, Fast, single-molecule localization that achieves theoretically minimum uncertainty. *Nat Methods* 7, 373 (May, 2010).
60. R. Parthasarathy, Rapid, accurate particle tracking by calculation of radial symmetry centers. *Nat Methods* 9, 724 (July, 2012).
61. V. Vogel, M. Sheetz, Local force and geometry sensing regulate cell functions. *Nat Rev Mol Cell Biol* 7, 265 (April, 2006).
62. P. Kanchanawong et al., Nanoscale architecture of integrin-based cell adhesions. *Nature* 468, 580 (Nov. 25, 2010).
63. T. Masters et al., Easy fabrication of thin membranes with through holes. Application to protein patterning. *PloS one* 7, (2012).
64. W. Engl, B. Arasi, J. P. Thiery, V. Viasnoff Mechanosensitive regulation of E-cadherin supramolecular organization revealed by model adhesive cell doublets. *Nat Cell Biol* under review, (2013).
65. Q. Li, M. Mercade Loubiere, P. Pluchon, Y. H, V. Viasnoff Engineering the mesoscale organization of intercellular tissue structure: mechanically induced bile canaliculi morphologies. *Lab on Chip* Accepted, (2013).
66. S. Khatau et al., A perinuclear actin cap regulates nuclear shape. *Proceedings of the National Academy of Sciences of the United States of America* 106, 19017 (2009).
67. I. Izeddin et al., Super-resolution dynamic imaging of dendritic spines using a low-affinity photoconvertible actin probe. *PLoS One* 6, e15611 (2011).
68. M. Zhang et al., Rational design of true monomeric and bright photoactivatable fluorescent proteins. *Nat Methods* 9, 727 (July, 2012).
69. K. Xu, H. P. Babcock, X. Zhuang, Dual-objective STORM reveals three-dimensional filament organization in the actin cytoskeleton. *Nat Methods* 9, 185 (February, 2012).

70. O. B. Spahn and S. S. Mani, "Microfabrication in MOEMS: micro opto-electro-mechanical systems, M. E. Motamedi, Ed. Washington:SPIE, 2005, p. 28.
71. M. Hoffmann and E. Voges, "Bulk Silicon Micromachining for MEMS in Optical Communication Systems", J. Micromech. Microeng., vol. 12, pp. 349-360, July 2002.
72. Hyun-Seok Kim, Jung-Mu Kim, Yong-Seung Bang, Eun-Seok Song, Chang-Hyeon J, and Yong-Kweon Kim, "Fabrication of a vertical sidewall using double-sided anisotropic etching of <1 0 0> oriented silicon", J. Micromech. Microeng. 22 (2012) 095014 (11 pp).
I. Zubel, "Silicon anisotropic etching in alkaline solutions III: On the possibility of spatial structures forming in the course of Si (100) anisotropic etching in KOH and KOH+IPA solutions", Sensors and Actuators 84 (2000) 116-125.
74. Irena Zubel, Irena Barycka, Kamilla Kotowska, Maøgorzata Kramkowska, "Silicon anisotropic etching in alkaline solutions IV The effect of organic and inorganic agents on silicon anisotropic etching process", Sensors and Actuators A 87 (2001) 163-171.
75. Lärmer F; Schilp A Method of anisotropically etching silicon, U.S. Pat. Nos. 4,855,017, 4,784,720.
76. Sophie Garidel; Marc Zelsmann; Pauline Voisin; Nevine Rochat; Philippe Michallon; Structure and stability characterization of anti-adhesion self-assembled monolayers formed by vapour deposition for NIL use. Proc. SPIE 6517, Emerging Lithographic Technologies XI, 65172C (Mar. 21, 2007)
77. J. C. Gebhardt, D. M. Suter, R. Roy et al., Nat Methods 10 (5), 421 (2013).
78. J. G. Ritter, R. Veith, J. P. Siebrasse et al., Opt Express 16 (10), 7142 (2008).
79. D. Resnik, D. Vrtacnik, U. Aljancic et al., Journal of Micromechanics and Microengineering 15 (6), 1174 (2005).

The invention claimed is:

1. A sample holding device for use in transverse illumination of a sample or sub-components of a sample comprising:
a transparent support substrate comprising a base, a plurality of grooves and a sample well, the sample well adapted to contain and be compatible with said sample,
wherein the sample well is disposed between first and second grooves of the plurality of grooves, the first and second grooves each comprising a cavity flanked by two angled reflective surfaces, the angled reflective surfaces being at least partially coated with metal,
wherein the sample well is defined by a first vertical wall of the transparent support substrate, a second vertical wall of the transparent support substrate, and the base of the transparent support substrate, the first vertical wall adjacent to one of the two angled reflective surfaces flanking the cavity of the first groove and the second vertical wall adjacent to one of the two angled reflective surfaces flanking the cavity of the second groove, and the first and second vertical walls oriented vertically with respect to the base of the transparent support substrate,
wherein the angled reflective surface adjacent to the first vertical wall and the angled reflective surface adjacent to the second vertical wall are configured to direct a transverse light beam from a light source through a sample contained within said sample well to provide substantially transverse illumination of the sample contained therein and imaging of the sample using a single objective,
wherein the angled reflective surfaces are oriented at an angle of 45°+/−5% with respect to the base of the transparent support substrate, enabling an excitation beam to reflect perpendicular to an optical axis of the single objective, and
wherein the height, length, and width of the sample well are each between 10 µm and 400 µm.

2. The device according to claim 1, wherein said metal comprises gold, chromium, both gold and chromium, or a mixture of deposited materials.

3. The device according to claim 1, wherein said sample comprises a cell or cells.

4. The device according to claim 3 wherein said cell or cells are live.

5. The device according to claim 3 wherein said cell or cells are fixed.

6. The device according to claim 1, wherein said device comprises a plurality of sample wells of similar or identical dimensions and arranged in an array and adapted for sequential or simultaneous analysis of samples contained within said sample wells.

7. The device according to claim 1, wherein said device is fabricated from a UV curable polymer, an acrylate based polymer, a polycarbonate based polymer, a polystyrene polymer, or an elastomeric polymer.

8. The device according to claim 7, wherein said device is fabricated from an acrylate based polymer, and wherein the acrylate based polymer is a polyacrylate.

9. The device according to claim 7, wherein said device is fabricated from an elastomeric polymer, and the elastomeric polymer is an organic silicone based polymer.

10. The device according to claim 9, wherein said device is fabricated from an organic silicone based polymer, and the organic silicone based polymer is polydimethylsiloxane.

11. The device according to claim 1, wherein said device further comprises a removable closure contacting an opening of the sample well to creates a closed sample well to contain the sample.

12. The device according to claim 1, wherein the height and/or length and/or width of said sample well is 50 µm, 100 µm, 200 µm, or 300 µm.

13. A method to image a biological sample using a microscope comprising:
i) providing the device according to claim 1, comprising one or more samples;
ii) assembling said device into a microscope;
iii) illuminating said sample by the provision of a light source directed to an objective comprising the angled reflective surfaces of said device to reflect a light sheet through a part of said sample;
iv) collecting the light emitted by said sample by the objective of iii) above; and
v) collecting the image so formed and optionally storing an image of said sample.

14. The method according to claim 13, wherein said light source is a Gaussian beam or scanned Gaussian beam, a Gaussian light sheet, or a Bessel beam or a scanned Bessel beam.

15. The method according to claim 13, wherein said microscope comprises a variable focus lens which controls the focal point of a light sheet generated by said light source.

16. The method according to claim 13, comprising contacting one or more samples comprising one or more cell types with an agent to be tested to determine an effect of said agent on said one or more samples.

17. The method according to claim 13, comprising contacting one or more samples obtained from a subject and comparing the sample with a normal control sample to determine differences between the sample tested and the normal control sample.

\* \* \* \* \*